(12) United States Patent
Choi et al.

(10) Patent No.: US 12,342,024 B2
(45) Date of Patent: Jun. 24, 2025

(54) ELECTRONIC APPARATUS, SERVER AND METHOD OF CONTROLLING THE SAME

(71) Applicant: SAMSUNG ELECTRONICS CO., LTD., Suwon-si (KR)

(72) Inventors: Kilsoo Choi, Suwon-si (KR); Kwansik Yang, Suwon-si (KR); Jongin Lee, Suwon-si (KR); Sehyun Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/102,337

(22) Filed: Jan. 27, 2023

(65) Prior Publication Data
US 2023/0179815 A1 Jun. 8, 2023

Related U.S. Application Data

(63) Continuation of application No. PCT/KR2021/009508, filed on Jul. 22, 2021.

(30) Foreign Application Priority Data

Jul. 28, 2020 (KR) .......................... 10-2020-0093535

(51) Int. Cl.
*H04N 5/445* (2011.01)
*H04N 21/24* (2011.01)
(Continued)

(52) U.S. Cl.
CPC ..... *H04N 21/2665* (2013.01); *H04N 21/2402* (2013.01); *H04N 21/4316* (2013.01)

(58) Field of Classification Search
CPC ........... H04N 21/2665; H04N 21/2402; H04N 21/4316; H04N 21/4312; H04N 21/21805;
(Continued)

(56) References Cited

U.S. PATENT DOCUMENTS 6,384,846 B1 5/2002 Hiroi
9,749,577 B1* 8/2017 Thomas ............... H04N 5/91
(Continued)

FOREIGN PATENT DOCUMENTS

JP 5940999 B2 6/2016
KR 10-2006-0115216 A 11/2006
(Continued)

OTHER PUBLICATIONS

International Search Report, PCT/ISA/210, dated Nov. 10, 2021, in PCT Application No. PCT/KR2021/009508.
(Continued)

*Primary Examiner* — Annan Q Shang
(74) *Attorney, Agent, or Firm* — STAAS & HALSEY LLP

(57) ABSTRACT

The disclosure relates to an electronic apparatus, a server, and a method of controlling the same, the electronic apparatus including: a display; an interface; and a processor configured to receive data of a plurality of pieces of content from an external apparatus through the interface, and process the received data to display images of the plurality of pieces of content on the display, the processor being configured to identify a state of available resources for processing the data, transmit information about the identified state of resources to the external apparatus to mix two or more pieces of content among the plurality of pieces of content into one steam based on the identified state of resources, and receive the data of the plurality of pieces of content obtained by mixing the two or more pieces of content into one stream from the external apparatus.

13 Claims, 17 Drawing Sheets

(51) Int. Cl.
*H04N 21/2665* (2011.01)
*H04N 21/431* (2011.01)

(58) Field of Classification Search
CPC .......... H04N 21/43615; H04N 21/442; H04N 21/4622; H04N 21/4363; H04N 21/47202
See application file for complete search history.

(56) References Cited

U.S. PATENT DOCUMENTS

| | | |
|---|---|---|
| 10,205,985 B2 | 2/2019 | Lue-Sang et al. |
| 11,343,551 B1* | 5/2022 | Brailovskiy ..... H04N 21/23439 |
| 2003/0088646 A1* | 5/2003 | Yeo .................. G06F 16/54 348/E7.071 |
| 2005/0183121 A1* | 8/2005 | Kim ............... H04N 21/234309 725/35 |
| 2007/0019551 A1 | 1/2007 | Pozhenko et al. |
| 2008/0310301 A1* | 12/2008 | Wade, Jr. ......... H04N 21/26216 370/230 |
| 2011/0029606 A1 | 2/2011 | Ozawa |
| 2012/0139945 A1 | 6/2012 | Choi |
| 2013/0185353 A1 | 7/2013 | Rondao Alface et al. |
| 2014/0344470 A1 | 11/2014 | Lee et al. |
| 2015/0143438 A1* | 5/2015 | Kwon ................ H04N 21/2665 725/94 |
| 2015/0288617 A1* | 10/2015 | Dasher ............... H04N 21/2662 709/226 |
| 2015/0288732 A1* | 10/2015 | Phillips .............. H04N 21/6408 709/219 |
| 2016/0119572 A1* | 4/2016 | Slupik ................ H04N 21/4183 348/445 |
| 2018/0035136 A1 | 2/2018 | Crowe |
| 2018/0068489 A1 | 3/2018 | Kim et al. |
| 2019/0267041 A1* | 8/2019 | Ricciardi ......... H04N 21/23418 |
| 2019/0333265 A1 | 10/2019 | Kim et al. |
| 2020/0213648 A1* | 7/2020 | Novoa, III ....... H04N 21/44227 |
| 2021/0194991 A1* | 6/2021 | Rickeby ............. H04N 21/2343 |
| 2021/0195285 A1* | 6/2021 | Lee .................. H04N 21/23103 |
| 2021/0243364 A1* | 8/2021 | Kumar ................. G06F 9/5044 |
| 2022/0095001 A1* | 3/2022 | Harviainen ........ H04N 21/6587 |

FOREIGN PATENT DOCUMENTS

| | | |
|---|---|---|
| KR | 10-0854714 B1 | 8/2008 |
| KR | 10-2010-0114014 A | 10/2010 |
| KR | 10-2010-0124811 | 11/2010 |
| KR | 10-2013-0029121 | 3/2013 |
| KR | 10-1253278 B1 | 4/2013 |
| KR | 10-2016-0124479 | 10/2016 |
| KR | 10-1832463 B1 | 2/2018 |
| KR | 10-2018-0080474 | 7/2018 |
| KR | 10-2019-0088947 A | 7/2019 |
| WO | WO 2009/073796 A1 | 6/2009 |
| WO | WO 2009/109374 A2 | 9/2009 |

OTHER PUBLICATIONS

Written Opinion, PCT/ISA/237, dated Nov. 10, 2021, in PCT Application No. PCT/KR2021/009508.
Office Action dated Oct. 14, 2024, in Korean Application No. 10-2020-0093535.

* cited by examiner

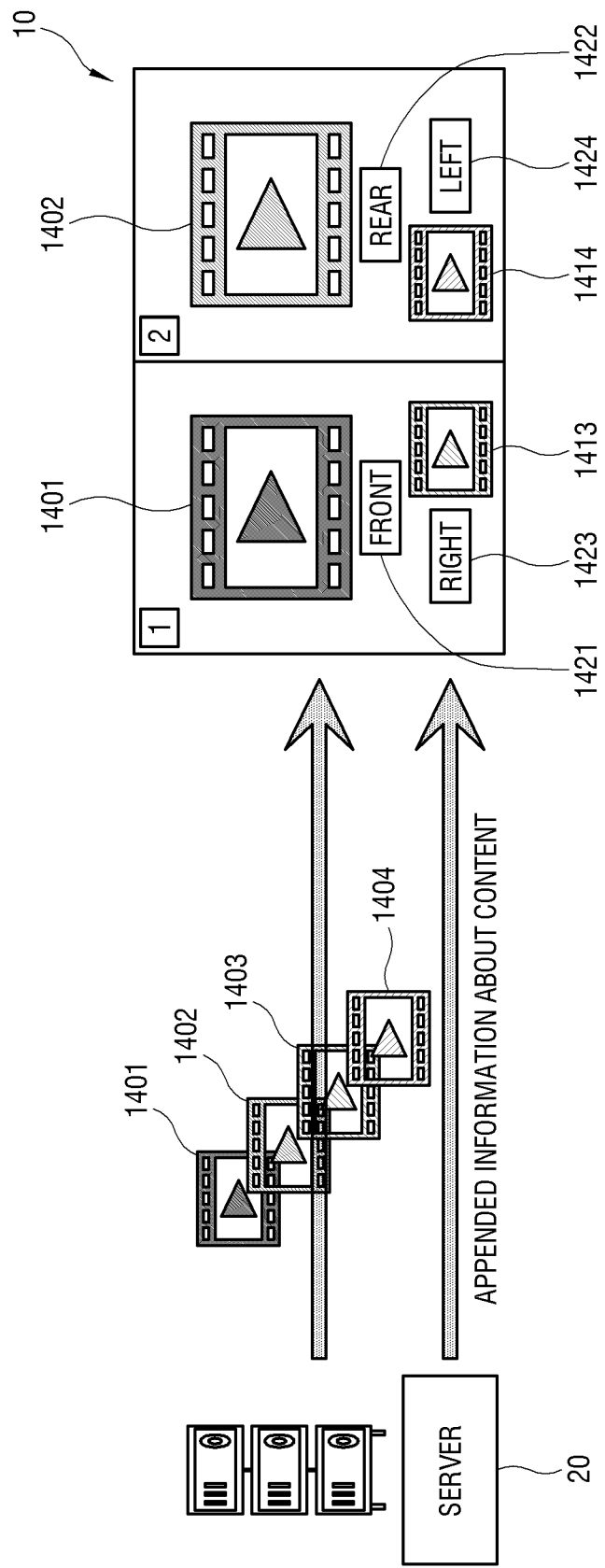

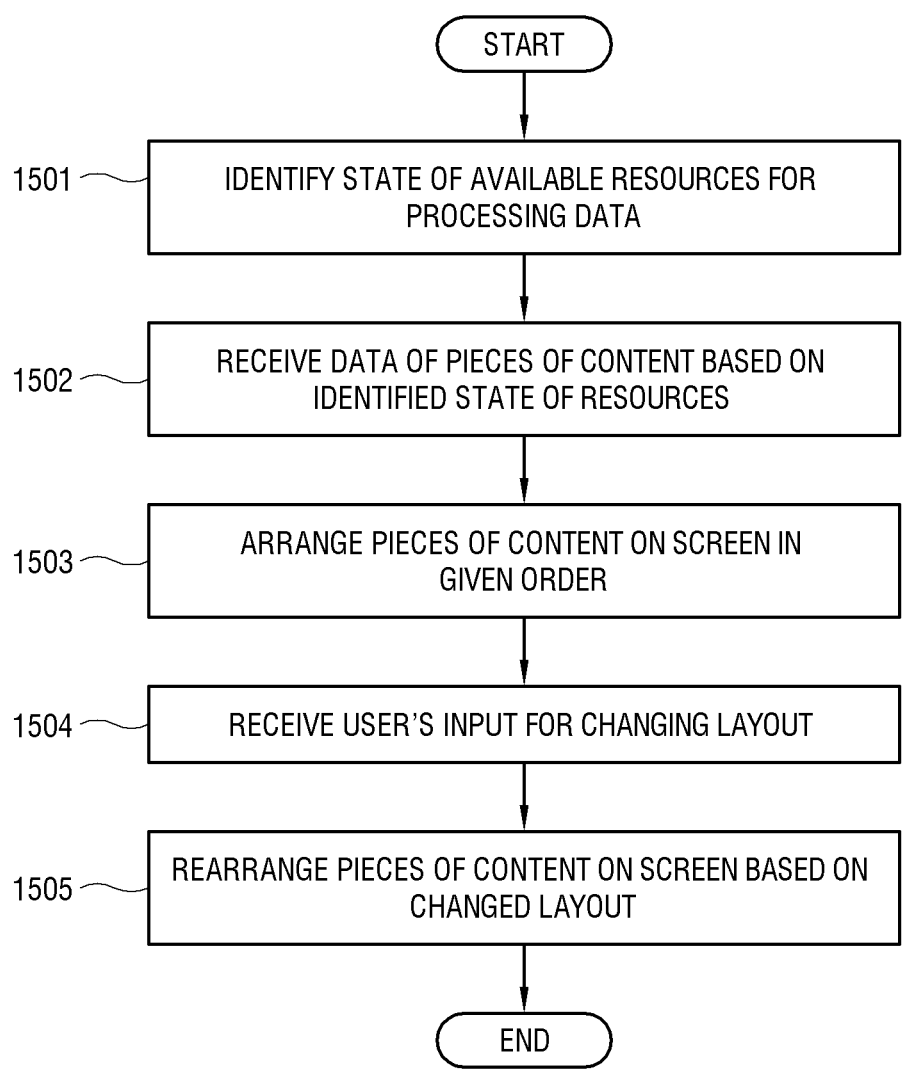

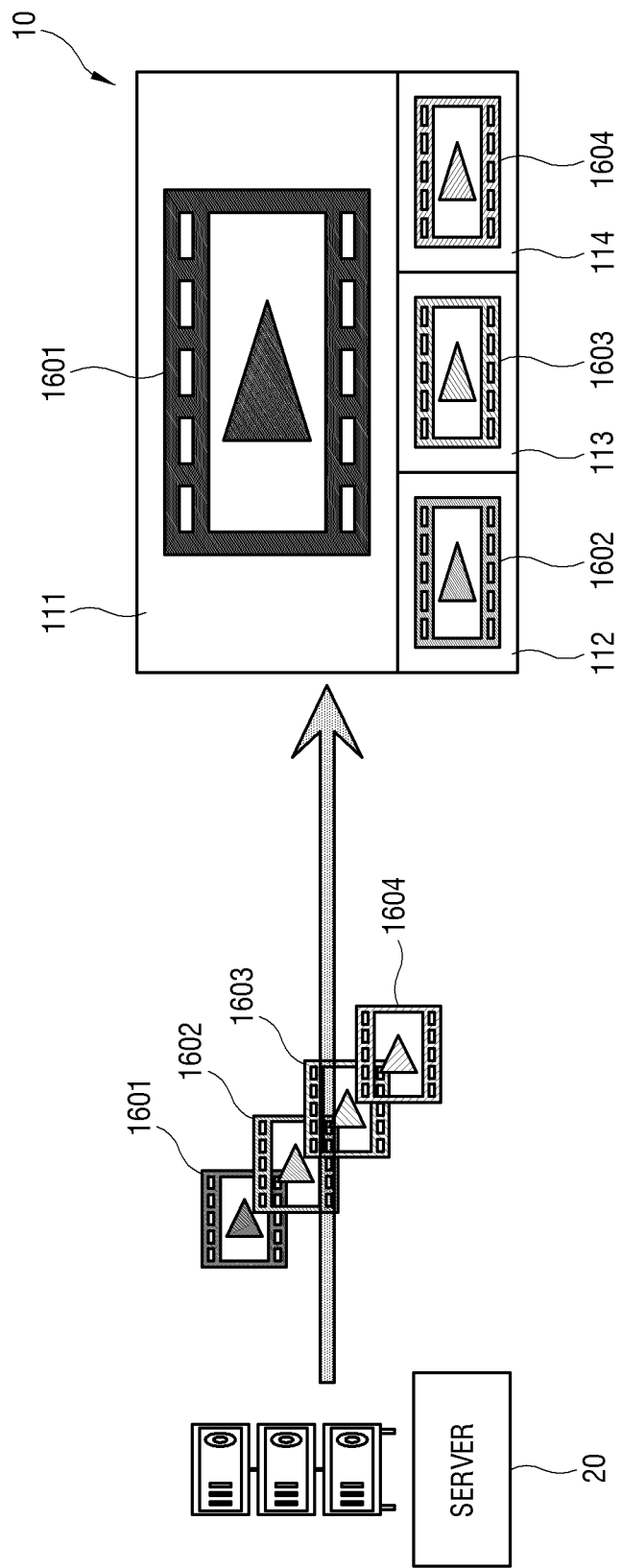

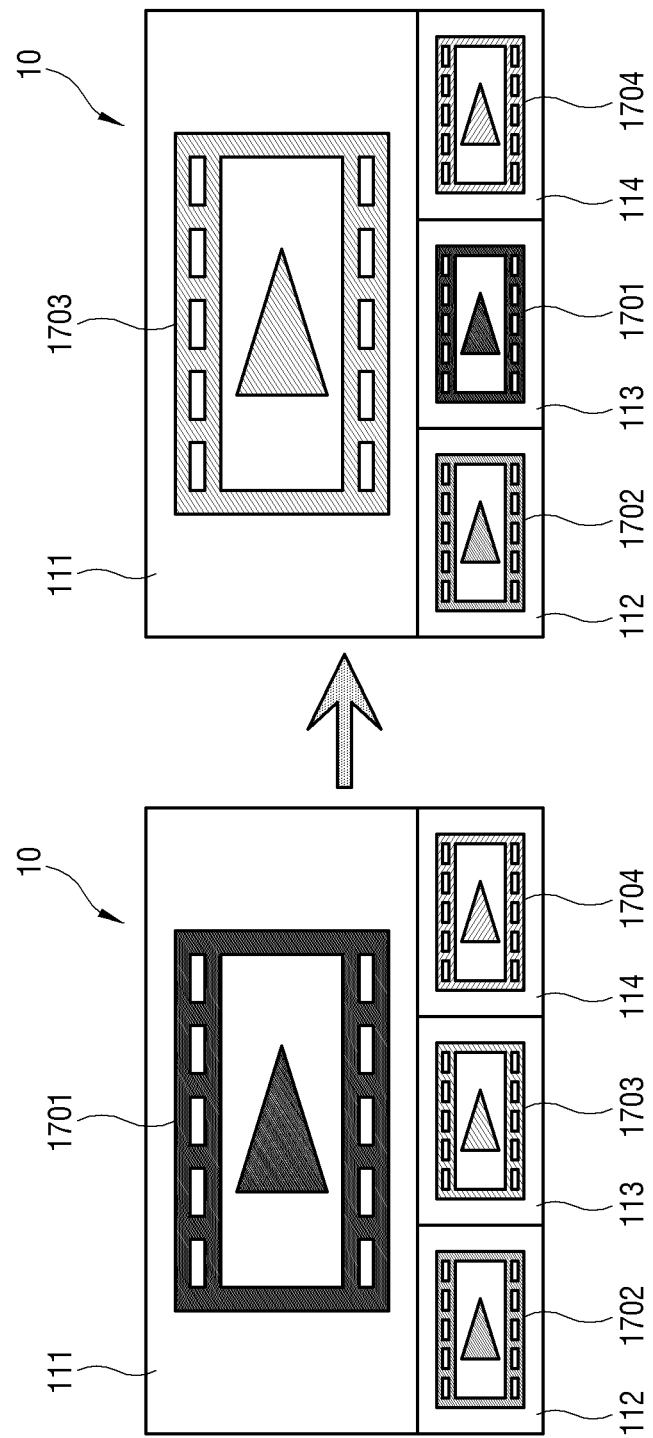

ELECTRONIC APPARATUS, SERVER AND METHOD OF CONTROLLING THE SAME

CROSS-REFERENCE TO RELATED THE APPLICATION

This application is a continuation of International Application PCT/KR2021/009508, filed on Jul. 22, 2021, and is based on and claims priority to Korean Patent Application No. 10-2020-0093535, filed on Jul. 28, 2020, the disclosures of which are incorporated by reference herein in their entireties.

BACKGROUND

1. Field

The disclosure relates to an electronic apparatus, a server, and a method of controlling the same, and more particularly to an electronic apparatus, a server, and a method of controlling the same, in which multi-view streaming for displaying a plurality of pieces of content on a screen is supported.

2. Description of Related Art

An electronic apparatus with a display, such as a TV or a terminal apparatus, receives various pieces of content from an external source, and displays an image based on the content on the display.

With the recent emergence of various video services using network environment, demand for high-definition live broadcasting is increasing.

Thus, attempts for broadcasting services or video services based on a live streaming method are gradually expanding.

As an example of such a live streaming service, the electronic apparatus may support multi-view streaming or multi-video streaming to simultaneously receive and display a plurality of pieces of content on the display.

To perform the multi-view streaming, the electronic apparatus may divide a display screen into a plurality of regions, receive and process the plurality of pieces of content in real time, and display the plurality of processed pieces of content on the respective divided regions.

However, within the limited available hardware or software resources of the electronic apparatus, it may be difficult for the electronic apparatus to simultaneously receive and process a predetermined number of pieces of content. Therefore, it may be inconvenient for a user to view the content because images are not normally displayed on the screen as some pieces of displayed content are distorted.

Further, the screen divided by only a predetermined number or pattern to display the content is required to be implemented as a multi-view screen with various layouts in consideration of content reproduction conditions, the content's own characteristics, a user's preference, etc.

SUMMARY

According to an embodiment of the disclosure, there is provided an electronic apparatus including: a display; and a processor configured to identify a state of available resources for processing data of a plurality of pieces of content from an external apparatus, transmit information about the identified state of resources to the external apparatus to mix two or more pieces of content among the plurality of pieces of content into one steam based on the identified state of resources, receive data of the plurality of pieces of content obtained by mixing the two or more pieces of content into one stream from the external apparatus, and display images on the display based on the received data.

The external apparatus may include a first external apparatus and a second external apparatus, and the processor may be configured to: transmit the information about the identified state of resources to the first external apparatus, and receive the data of the plurality of pieces of content obtained by mixing the two or more pieces of content into one stream from the second external apparatus.

The processor may be configured to: receive information about a network address or an application from the external apparatus, and receive the data of the plurality of pieces of content obtained by mixing the two or more pieces of content into one stream from the second external apparatus through the network address or the application indicated by the received information.

The processor may be configured to: based on identification that capacity of resources required to process the data of the plurality of pieces of content exceeds a state of available resources of the electronic apparatus, control the information about the identified state of resources to be transmitted to the external apparatus.

The information about the identified state of resources may include information about a decoder or a scaler in the electronic apparatus.

The data of the plurality of pieces of content obtained by mixing the two or more pieces of content into one stream may correspond to mixing of two or more pieces of content based on priority given for the plurality of pieces of content.

The processor may be configured to: based on identification that capacity of resources required to process the data of the plurality of pieces of content exceeds the state of available resources of the electronic apparatus, display a user interface (UI) corresponding to at least one piece of content among the plurality of pieces of content on the display; and control the display to display an image of content corresponding to a selected UI based on reception of a user's input to the UI.

The plurality of pieces of content may correspond to segments of a multi-angle image, and the processor may be configured to control the display to further display a UI showing direction information of the plurality of pieces of content, based on appended information received from the external apparatus.

According to an embodiment of the disclosure, there is provided a server including: an interface; and a processor configured to: obtain information about a state of available resources for processing data of a plurality of pieces of content from an electronic apparatus through the interface; mix two or more pieces of content among the plurality of pieces of content into one stream based on the obtained information; transmit data of the plurality of pieces of content obtained by mixing the two or more pieces of content into one stream to the electronic apparatus through the interface.

The processor may be configured to transmit the data of the plurality of pieces of content obtained by mixing the two or more pieces of content into one stream, from a connectable external apparatus to the electronic apparatus through the interface.

The processor may be configured to transmit information about a network address or an application of an external apparatus capable of providing the data of the plurality of pieces of content obtained by mixing the two or more pieces of content into one stream to the electronic apparatus through the interface.

The processor may be configured to mix the two or more pieces of content among the plurality of pieces of content based on priorities given for the plurality of pieces of content.

According to an embodiment of the disclosure, there is provided a method including: identifying a state of available resources for processing data of a plurality of pieces of content from an external apparatus; transmitting information about the identified state of resources to the external apparatus to mix two or more pieces of content among the plurality of pieces of content into one steam based on the identified state of resources, receiving data of the plurality of pieces of content obtained by mixing the two or more pieces of content into one stream from the external apparatus; and displaying images based on the received data.

The external apparatus may include a first external apparatus and a second external apparatus, and the transmitting may include transmitting the information about the identified state of resources to the first external apparatus, and the receiving may include receiving the data of the plurality of pieces of content obtained by mixing the two or more pieces of content into one stream from the second external apparatus.

The method may further include receiving information about a network address or an application from the external apparatus, and the receiving may include receiving the data of the plurality of pieces of content obtained by mixing the two or more pieces of content into one stream from the second external apparatus through the network address or the application indicated by the received information.

The transmitting to the external apparatus may include, transmitting the information about the state of resources to the external apparatus based on identification that capacity of resources required to process the data of the plurality of pieces of content exceeds the state of available resources of the electronic apparatus.

The information about the state of resources may include information about a decoder or a scaler provided in the electronic apparatus.

The mixed data of the plurality of pieces of content may correspond to mixing of two or more pieces of content based on priority given for the plurality of pieces of content.

The method may further include: displaying a user interface (UI) corresponding to at least one among the plurality of pieces of content based on identification that capacity of resources required to process the data of the plurality of pieces of content exceeds the state of available resources of the electronic apparatus; and displaying an image of content corresponding to a selected UI based on reception of a user's input to the UI.

The plurality of pieces of content may correspond to segments of a multi-angle image, and the method may further include displaying a UI showing direction information of the plurality of pieces of content, based on appended information received from the external apparatus.

Aspects of various embodiments of the present disclosure will be set forth in part in the description which follows and, in part, will be apparent from the description, or may be learned by practice of the presented embodiments.

BRIEF DESCRIPTION OF THE DRAWINGS

Aspects, features, and advantages of certain embodiments of the present disclosure will be more apparent from the following description taken in conjunction with the accompanying drawings, in which:

FIG. 14 is a view showing still another example of displaying a plurality of pieces of content together with a UI in an electronic apparatus according to another embodiment of the disclosure.

FIG. 15 is a flowchart showing control operations of performing multi-view streaming corresponding to a state of resources in an electronic apparatus according to still another embodiment of the disclosure.

FIG. 16 is a view showing an example that a plurality of pieces of content is arranged and displayed on a screen in an electronic apparatus according to still another embodiment of the disclosure.

FIG. 17 is a view showing an example that a plurality of pieces of content is rearranged and displayed on a screen in an electronic apparatus according to still another embodiment of the disclosure.

DETAILED DESCRIPTION

Figure 1:
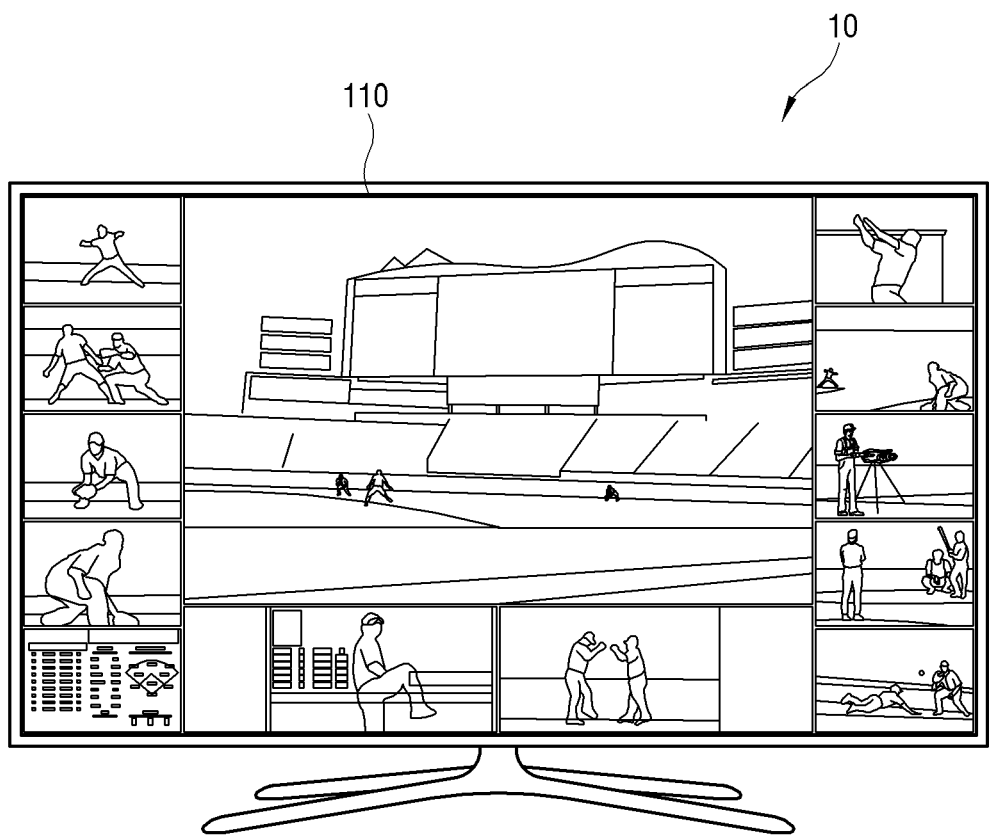
FIG. 1 illustrates an example of an electronic apparatus according to an embodiment of the disclosure.

Below, exemplary embodiments will be described in detail with reference to accompanying drawings. In the drawings, like numerals or symbols refer to like elements having substantially the same function, and the size of each element may be exaggerated for clarity and convenience of description. However, the configurations and functions illustrated in the following exemplary embodiments are not construed as limiting the present inventive concept and the key configurations and functions. In the following descriptions, details about publicly known functions or features will be omitted if it is identified that they cloud the gist of the present inventive concept.

In the following exemplary embodiments, terms 'first', 'second', etc. are only used to distinguish one element from another, and singular forms are intended to include plural forms unless otherwise mentioned contextually. In the following exemplary embodiments, it will be understood that terms 'comprise', 'include', 'have', etc. do not preclude the presence or addition of one or more other features, numbers, steps, operation, elements, components or combination thereof. In addition, a 'module' or a 'portion' may perform at least one function or operation, be achieved by hardware, software or combination of hardware and software, and be integrated into at least one module. In the disclosure, at least one among a plurality of elements refers to not only all the plurality of elements but also both each one of the plurality of elements excluding the other elements and a combination thereof.

Various embodiment of the disclosure provide an electronic apparatus, a server, and a method of controlling the same, in which a plurality of pieces of content provided to an electronic apparatus is normally displayed without distortion, thereby solving a user's inconvenience in viewing.

Further, various embodiments of the disclosure provide an electronic apparatus, a server, and a method of controlling the same, in which a multi-view screen is configured with various layouts to display a plurality of pieces of content, thereby improving a user's satisfaction of viewing.

Various embodiments of the disclosure provide an electronic apparatus, a server, and a method of controlling the same, in which data of a plurality of pieces of content is processed corresponding to a state of available resources for processing the data in the electronic apparatus and then provided to the electronic apparatus, so that the plurality of pieces of content can be normally displayed without distortion, thereby reducing a user's visual fatigue and solving the user's inconvenience in viewing.

Further, according to various embodiments of the disclosure, a multi-view screen is configured with various layouts to display a plurality of pieces of content, thereby improving a user's satisfaction of viewing.

FIG. 1 illustrates an example of an electronic apparatus according to an embodiment of the disclosure.

According to an embodiment of the disclosure, an electronic apparatus 10 may be implemented as a display apparatus including a display 110 as shown in FIG. 1.

The electronic apparatus 10 according to an embodiment of the disclosure receives a signal from an external signal source, for example, data about content, and processes the received data of content according to preset processes so as to be displayed as an image on the display 110.

According to an embodiment, the electronic apparatus 10 implemented as the display apparatus may include a TV that processes a broadcast image based on at least one among a broadcast signal, broadcast information or broadcast data received from a transmitter of a broadcasting station. In this case, the electronic apparatus 10 may include a tuner to be tuned to a channel corresponding to a broadcast signal.

However, the disclosure is not limited to the implementation example of the electronic apparatus 10. Alternatively, the electronic apparatus 10 may be implemented as an image processing apparatus such as a set-top box that transmits a signal to an external display connected by a wire or wirelessly. Alternatively, the electronic apparatus 10 may be implemented as a terminal apparatus (hereinafter referred to as a user terminal or a user device) with a display, such as a smart phone, a tablet, and a smart pad. Alternatively, the electronic apparatus 10 may be applied to a monitor for a desktop or laptop computer (or a personal computer (PC)).

When the electronic apparatus 10 is a TV, the electronic apparatus 10 may receive broadcast content based on at least one among a broadcast signal, broadcast information or broadcast data from a transmitter of a broadcasting station directly or through an additional apparatus connectable with the electronic apparatus 10 by a cable, for example, through a set-top box (STB), a one-connect box (OC box), a media box, etc. Here, the connection between the electronic apparatus 10 and the additional apparatus is not limited to the cable, but may employ various wired/wireless interfaces.

The electronic apparatus 10 may, for example, wirelessly receive a radio frequency (RF) signal, i.e., broadcast content transmitted from the broadcasting station. To this end, the electronic apparatus 10 may include an antenna for receiving a broadcast signal.

In the electronic apparatus 10, the broadcast content may be received through a terrestrial wave, a cable, a satellite, etc., and a signal source is not limited to the broadcasting station. In other words, any apparatus or station capable of transmitting and receiving data may be included in the source according to the disclosure.

Figure 4:
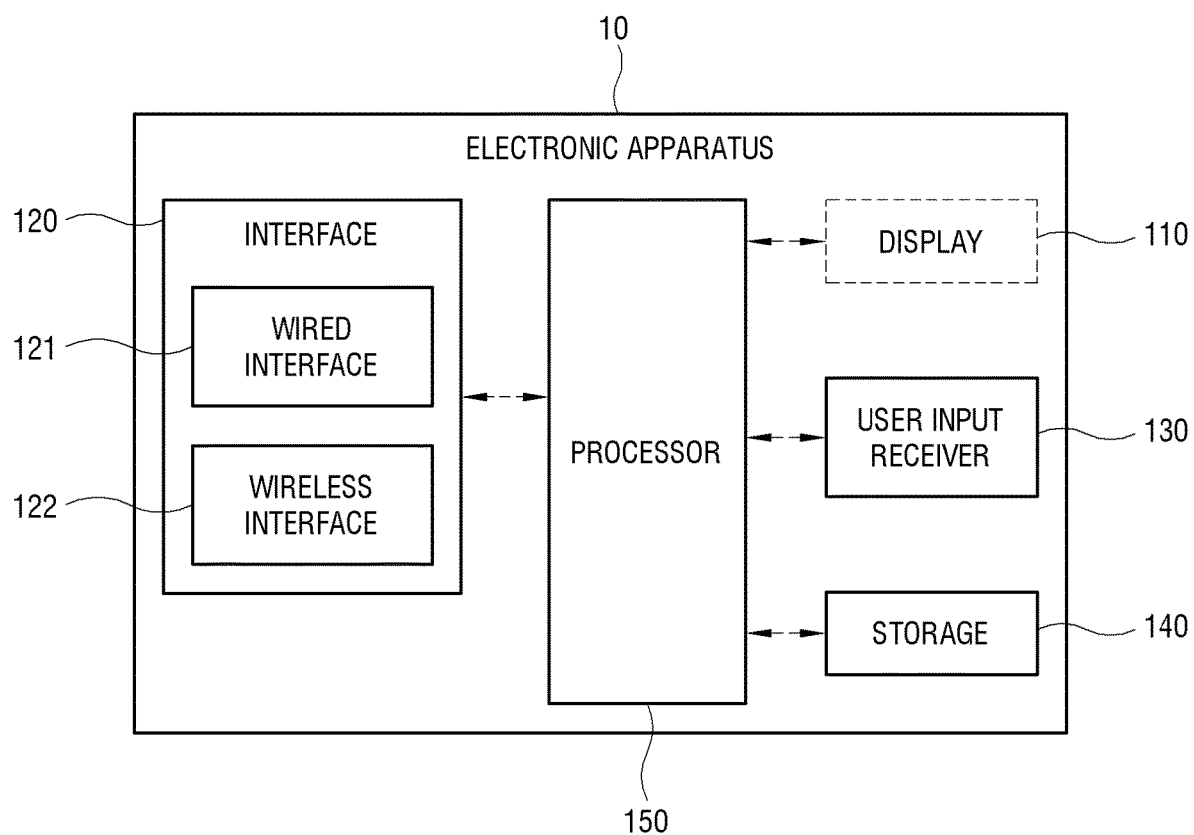
FIG. 4 is a block diagram of an electronic apparatus according to an embodiment of the disclosure.

Standards of a signal received in the electronic apparatus 10 may be varied depending on the types of the apparatus, and the electronic apparatus 10 may receive a signal as image content based on high definition multimedia interface (HDMI), HDMI-consumer electronics control (CEC), display port (DP), digital visual interface (DVI), composite video, component video, super video, DVI, Thunderbolt, RGB cable, syndicat des constructeurs d'appareils radiorécepteurs et téléviseurs (SCART), universal serial bus (USB), or the like standards by a cable, according to the interface 120 (see FIG. 4).

According to an embodiment, the electronic apparatus 10 may be implemented as a smart TV or an Internet protocol (IP) TV. The smart TV refers to a TV that can receive and display a broadcast signal in real time, have a web browsing function to search and consume various pieces of content through the Internet while displaying the broadcast signal in real time, and provide a convenient user environment for this end. Further, the smart TV can provide an interactive service to a user because it includes an open software platform. Therefore, the smart TV can provide various pieces of content, for example, content of an application for a predetermined service to a user through the open software platform. Such an application refers to an application program for various kinds of services, for example, applications for social network service (SNS), finance, news, weather, map, music, movie, game, electronic book, and the like services.

The electronic apparatus 10 may process a signal to display a moving image, a still image, an application, an on-screen display (OSD), a user interface (UI) for controlling various operations, etc. on a screen based on a signal/data stored in an internal/external storage medium.

The electronic apparatus 10 may use wired or wireless network communication to receive content from various external apparatuses including a server 20 (see FIG. 2) and a terminal apparatus as a source for providing content, but there are no limits to the kinds of communication.

Specifically, the electronic apparatus 10 may use the wireless network communication to receive a signal corresponding to standards of Wi-Fi, Wi-Fi Direct, Bluetooth, Bluetooth low energy, Zigbee, UWB, NFC, etc. as image content corresponding to the type of the interface 120 (to be described later). Further, the electronic apparatus 10 may use Ethernet or the like wired network communication to receive a content signal.

According to an embodiment, the external apparatus implemented as the server 20 may be provided as a content provider, i.e., a content server that can transmit content to various apparatuses such as the electronic apparatus 10 through the wired or wireless network. For example, the external apparatus may provide a media file based on video on demand (VOD) service, web content, etc. by a streaming method in real time.

According to an embodiment of the disclosure, there may be a plurality of external apparatuses, i.e., servers 20. In this case, the electronic apparatus 10 may be implemented to connect with each of the plurality of external apparatuses and receive various pieces of content from each connected external apparatus.

The electronic apparatus 10 may, for example, receive media content or video content based on the VOD service from an over-the-top (OTT) server capable of providing an OTT service such as Netflix or a web server such as YouTube.

The electronic apparatus 10 may execute an application for reproducing content, for example, a VOD application to receive content from an external apparatus provided as the server 20 for providing the content, ad process the received content, thereby outputting, i.e., displaying an image corresponding to that content through the display 110. Here, the electronic apparatus 10 may receive the content from the server 20 based on a user account corresponding to the executed application.

According to an embodiment, the electronic apparatus 10 may receive data of a plurality of pieces of content from the external apparatus 20 by the streaming method in real time, and perform the multi-view streaming or the multi-video streaming to display the images of the plurality of pieces of content on the display 110.

Figure 2:
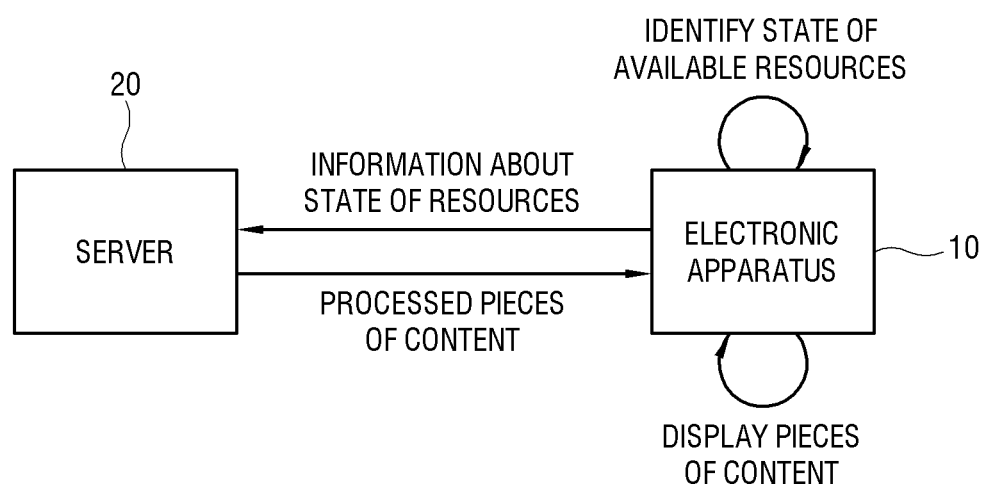
FIG. 2 is a view conceptually illustrating that multi-view streaming is performed in an electronic apparatus according to an embodiment of the disclosure.

FIG. 2 is a view conceptually illustrating that multi-view streaming is performed in an electronic apparatus according to an embodiment of the disclosure.

As shown in FIG. 2, the electronic apparatus 10 may communicate with the external apparatus, for example, the server 20 to transmit and receive data.

According to an embodiment, the external apparatus may be provided as the server 20 for providing content, which can provide content to various apparatuses such as the electronic apparatus through the wired or wireless network. For example, the external apparatus, i.e., the server 20 may be implemented as a broadcast server that provides a broadcast signal, i.e., broadcast content. Alternatively, the external apparatus, i.e., the server 20 may, for example, be implemented as a media server that provides a media file, i.e., media content based on a VOD service by a streaming method in real time, such as an OTT server capable of providing an OTT service. Alternatively, the external apparatus, i.e., the server 20 may be implemented as a web server that provides web content and the like video content by a streaming method in real time.

According to an embodiment, the server 20 may, as shown in FIG. 1, provide various broadcast images (or broadcast content) of broadcasting sports such as baseball and soccer or broadcasting a game to the electronic apparatus 10 by multi-view streaming. According to an alternative embodiment, the server 20 may provide a plurality of VOD preview images (or media content) to the electronic apparatus 10 by the multi-view streaming. However, according to the disclosure, there are no limits to the kinds of multi-view streaming images, and thus the server 20 may be implemented to transmit various pieces of content such as the broadcast content and the media content by the multi-view streaming.

According to an embodiment, the electronic apparatus 10 may, as shown in FIG. 2, identify the state of available resources for receiving and processing data of the plurality of pieces of content for multi-view streaming (hereinafter referred to as multi-view) from the server 20 or the like external apparatus, and transmit information about the state of resources of the electronic apparatus 10 to the server 20 according to identification results.

The server 20 may process, i.e., change or edit at least a part of the plurality of pieces of content, i.e., a multi-view target based on the received information about the state of the resources, and transmit the processed data of the plurality of pieces of content to the electronic apparatus 10. Here, the server 20 may generate the data of the plurality of pieces of content, at least a part of which is processed to correspond to the state of the available resources of the electronic apparatus 10, based on the received state of resources.

The electronic apparatus 10 receives the data of the plurality of pieces of content, at least a part of which is processed, from the server 20, and displays the plurality of pieces of content on the display 110 based on the received data. The received data of the plurality of pieces of content matches the state of the resources of the electronic apparatus 10, so that the electronic apparatus 10 can normally display the received data on the display 110 without generating image distortion or the like.

According to an embodiment, the processing for the content may include mixing or merging two or more pieces of content among the plurality of pieces of content to generate mixed or merged content. In other words, the server 20 merges, i.e., mixes at least two pieces of content among the plurality of pieces of content into the mixing content as one file. For example, the server 20 may mix all of the plurality of pieces of content, which are targeted for a multi-view, to generate the mixing content the mixing content as one file.

According to an embodiment, the mixing content may be provided as one stream from the server 20 to the electronic apparatus 10

According to an alternative embodiment, the processing for the content may include adjusting, i.e., decreasing the resolution of at least one piece of content among the plurality of pieces of content.

According to an alternative embodiment, the processing for the content may include changing the format, e.g., a compression type or a decoding type of at least one piece of content among the plurality of pieces of content. In other words, the server 20 may change the compression type to reduce the capacity of at least one piece of content among the plurality of pieces of content.

However, the processing for the content according to the disclosure may not be limited the foregoing embodiments, but may include various image processing processes for changing the content to match the resource states of the electronic apparatus 10. Further, the server 20 may simultaneously apply two or more processing processes, for example, both generating the mixing content and adjusting the resolution to generate the processed data of the plurality of pieces of content.

According to an embodiment of the disclosure, there may be a plurality of servers 20, i.e., a plurality of external apparatuses. For example, the external apparatus may include a first external apparatus and a second external apparatus.

According to an embodiment, the server 20 may be implemented as a plurality of servers that support multi-access edge computing or mobile edge computing (MEC).

Figure 3:
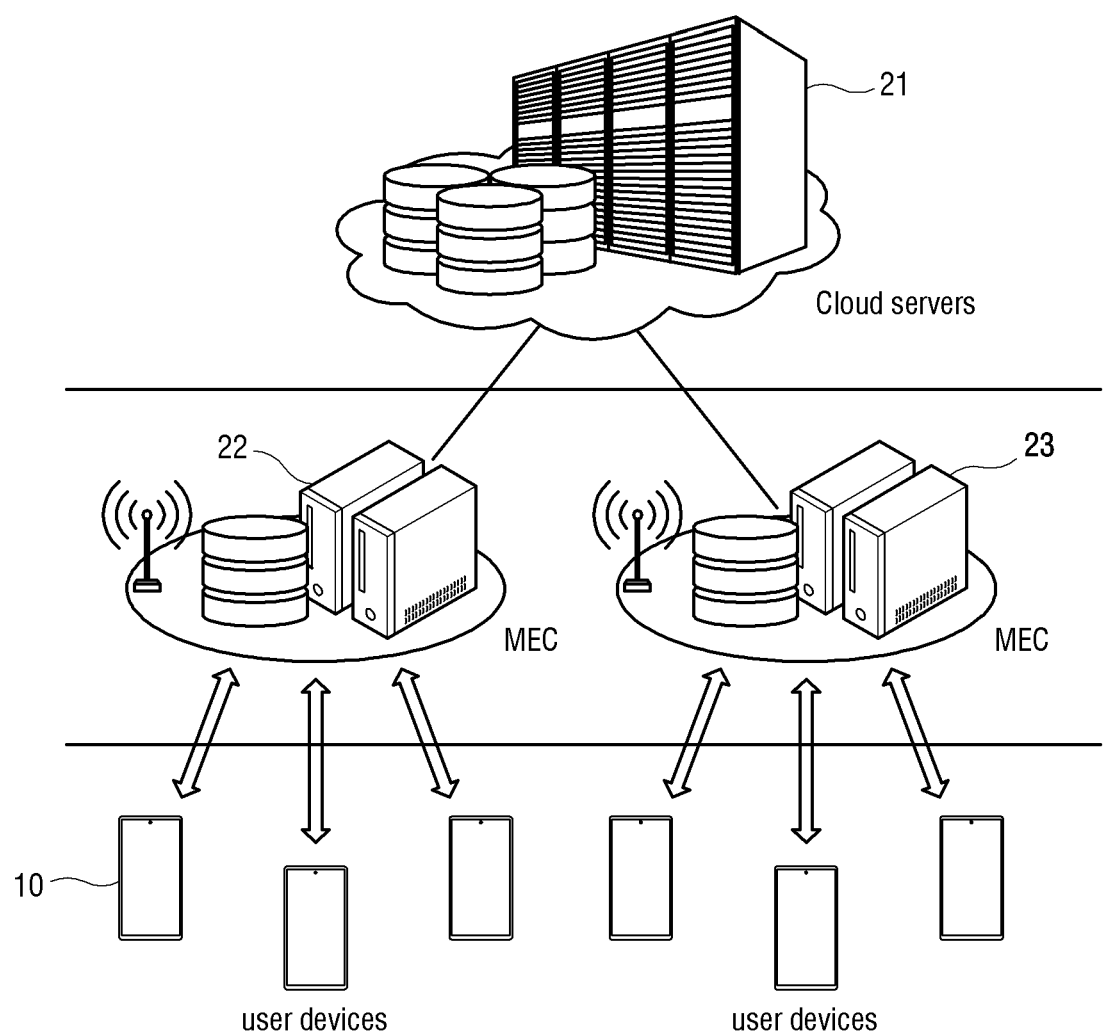
FIG. 3 illustrates an example of a configuration of a plurality of servers that implements a multi-access edge computing (MEC) system according to an embodiment of the disclosure.

FIG. 3 illustrates an example of a configuration of a plurality of servers that implements a MEC system according to an embodiment of the disclosure.

The MEC refers to moving some of traffic and service computing from a centralized cloud to a network edge, in which some data is analyzed, processed and stored in the network edge, i.e., the MEC server instead of transmitting and receiving all data to and from the cloud server.

According to an embodiment, the server 20 may, as shown in FIG. 3, include a first server 21 implemented as the cloud server, and a second server 22 and a third server 23 implemented as the MEC servers. Here, the first server 21 may be referred to as a first external server for the electronic apparatus 10, and the second server 22 and the third server 23 may be referred to as a second external apparatus and a third external apparatus for the electronic apparatus 10, respectively.

However, the MEC system shown in FIG. 3 is merely an example, and may be implemented in such a way that another configuration, for example, a fourth server is additional provided as the MEC server, or some configurations may be changed or excluded. In addition, FIG. 3 illustrates an example that the electronic apparatus 10 transmits and receives data to and from the second server 22 as the network edge, but a communication target with which the electronic apparatus 10 communicates is not limited to the second server 22.

According to an embodiment, the first server 21 may be implemented as the content server, and provide data of a plurality of pieces of content for the multi-view streaming to the electronic apparatus 10.

The second server 22 may communicate with the first server 21, for example, by receiving a signal from the first server 21, and transmitting data of the processed content obtained by processing at least a part of the plurality of pieces of content to the electronic apparatus 10. For example, the second external apparatus 22 may transmit the mixing content obtained by mixing two or more pieces of content among the plurality of pieces of content targeted for the multi-view into one stream to the electronic apparatus 10 in response to a signal, i.e., a command received from the first external apparatus 21.

Below, the configurations of the electronic apparatus and the server according to an embodiment of the disclosure will be described with reference to the accompanying drawings.

FIG. 4 is a block diagram of an electronic apparatus according to an embodiment of the disclosure.

However, FIG. 4 merely shows the exemplary elements of the electronic apparatus 10 according to an embodiment of the disclosure, and the first electronic apparatus according to an alternative embodiment may include elements different from those of FIG. 4. In other words, the electronic apparatus 10 of the disclosure may include another element besides the elements shown in FIG. 4, or may exclude at least one element from the elements shown in FIG. 4. Further, the electronic apparatus 10 of the disclosure may be implemented by changing some elements of those shown in FIG. 4.

The electronic apparatus 10 according to an embodiment of the disclosure may, as shown in FIG. 4, include the display 110.

The display 110 may display an image.

The display 110 may be, but not limited to, for example implemented by various display types such as liquid crystal, plasma, light-emitting diode, organic light-emitting diode, surface-conduction electron-emitter, carbon nano-tube, nano-crystal, etc. According to an embodiment, the display 110 may include a display panel for displaying an image thereon, and further include additional elements, for example, a driver according to its types.

According to an embodiment, the display 110 may display an image of content received from the source, i.e., the external apparatus such as the server 20.

According to an embodiment, the display 110 may display images of a plurality of pieces of content received from the server 20 by multi-view streaming.

According to an embodiment, at least a part of the plurality of pieces of content may be processed and displayed on the display 110. For example, the multi-view targets, i.e., two or more pieces of content among the plurality of pieces of content may be merged or mixed into one stream and displayed on the display 110.

The electronic apparatus 10 may include an interface 120.

The interface 120 allows the electronic apparatus 10 to communicate with various external apparatuses such as the server.

The interface 120 may include a wired interface 121. The wired interface 121 may include a connector for transmitting/receiving a signal/data based on the standards such as high-definition multimedia interface (HDMI), HDMI-consumer electronics control (CEC), USB, Component, DP, DVI, Thunderbolt, RGB cables, etc. Here, the wired interface 121 may include at least one connector, terminal or port respectively corresponding to such standards.

The wired interface 121 is embodied to include an input port to receive a signal from the source or the like, and further include an output port as necessary to interactively transmit and receive a signal.

The wired interface 121 may include a connector, port, etc. based on video and/or audio transmission standards, such as an HDMI port, a DisplayPort, a DVI port, Thunderbolt, composite video, component video, super video, and SCART, so as to connect with an antenna for receiving a broadcast signal based on broadcast standards such as terrestrial/satellite broadcasts, or a cable for receiving a broadcast signal based on cable broadcast standards. Alternatively, the electronic apparatus 10 may include a built-in antenna for receiving a broadcast signal.

when a video/audio signal received through the interface 120 is a broadcast signal, the electronic apparatus 10 may further include a tuner to be tuned to the channels corresponding to the received broadcast signals. The tuner may include a demodulator that demodulates a broadcast signal of a certain tuned channel and outputs a signal in the form of a transport stream (TS). In other words, the tuner and the demodulator may be designed as a single integrated chip, or may be respectively designed as separated two chips.

The wired interface 121 may include a connector or port based on universal data transmission standards, such as a USB port. The wired interface 121 may include a connector or port to which an optical cable based on optical transmission standards is connectable. The wired interface 121 may include a connector or port to which an external microphone or an external audio device with a microphone is connected for the reception or input of an audio signal from the microphone or audio device. The wired interface 121 may include a connector or port to which a headset, an earphone, an external loudspeaker and the like audio device is connected for the transmission or output of an audio signal to the audio device. The wired interface 121 may include a connector or port based on network transmission standards such as Ethernet. For example, the wired interface 121 may be implemented as a local area network (LAN) connected to a router or a gateway by a wire.

The wired interface 121 is connected to a set-top box, an optical media reproducing device or the like external device, an external display apparatus, a loudspeaker, a server, etc. through the connector or port by 1:1 or 1:N (where, N is a natural number), thereby receiving a video/audio signal from the external device or transmitting a video/audio signal to the external device. The wired interface 121 may include connectors or ports for individually transmitting video/audio signals.

The wired interface 121 may be implemented by a communication circuitry including wireless communication modules (e.g., an S/W module, a chip, etc.) corresponding to various kinds of communication protocols.

According to an embodiment, the wired interface 121 may be built-in the electronic apparatus 10 or implemented as a dongle or a module and detachably connected to the connector of the electronic apparatus 10.

The interface 120 may include a wireless interface 122.

The wireless interface 122 may be variously implemented corresponding to the implementation of the electronic apparatus 100. For example, the wireless interface 122 may employ wireless communication methods such as radio frequency, Zigbee, Bluetooth, Wi-Fi, ultrawideband (UWB), near field communication (NFC), etc.

The wireless interface 122 may be implemented by a communication circuitry including wired or wireless communication modules (e.g., an S/W module, a chip, etc.) corresponding to various kinds of communication protocols.

According to an embodiment, the wireless interface 122 includes a wireless local area network (WLAN) unit. The WLAN unit may be wirelessly connected to external apparatuses through an access point (AP) under control of the processor 150. The WLAN unit includes a Wi-Fi communication module.

According to an embodiment, the wireless interface 122 includes a wireless communication module supporting one-to-one direct communication between the electronic apparatus 10 and the external apparatus wirelessly without the AP. The wireless communication module may be implemented to support Wi-Fi direct, BT, BLE, or the like communication method. When the electronic apparatus 10 performs direct communication with the external apparatus, the storage 140 may be configured to store identification information (e.g. media access control (MAC) address or Internet protocol (IP) address) about the external apparatus with which the communication will be performed.

In the electronic apparatus 10 according to an embodiment of the disclosure, the wireless interface 122 is configured to perform wireless communication with the external apparatus by at least one of the WLAN unit and the wireless communication module according to its performance.

According to an alternative embodiment, the wireless interface 122 may further include a communication module based on various communication methods such as long-term evolution (LTE) or the like mobile communication, electromagnetic (EM) communication including a magnetic field, visible light communication (VLC), etc.

The wireless interface 122 may wirelessly communicate with the external apparatus such as the server 20 on the network, thereby transmitting and receiving a data packet to and from the external apparatus.

The wireless interface 122 may include an IR transmitter and/or an IR receiver to transmit and/or receive an infrared (IR) signal according to IR communication standards. The wireless interface 122 may receive or input a remote-control signal from a remote controller or other external apparatuses or transmit or output a remote-control signal to other external apparatuses through the IR transmitter and/or IR receiver. Alternatively, the electronic apparatus 10 may exchange a remote-control signal with the remote controller or other external apparatuses through the wireless interface 122 based on another method such as Wi-Fi, BT, etc.

According to an embodiment, the wireless interface 122 may transmit predetermined data as information about a user voice received through the microphone or the like voice input to the server or the like external apparatus. Here, there are no limits to the format/kind of data to be transmitted, and the data may, for example, include an audio signal corresponding to a voice uttered by a user, voice features extracted from the audio signal, etc.

Further, the wireless interface 122 may receive data based on a processing result of a corresponding user voice from the server or the like external apparatus. The electronic apparatus 10 may output a sound corresponding to the voice processing result through an internal or external loudspeaker, based on the received data.

However, the foregoing embodiment is merely an example, and the user voice may be processed by the electronic apparatus 10 without being transmitted to the server. In other words, according to an alternative embodiment, the electronic apparatus 10 may be implemented to serve as a speech-to-text (STT) server.

The electronic apparatus 10 may communicate with the remote controller or the like input device through the wireless interface 122, and receive a sound signal corresponding to the user voice from the input device.

In the electronic apparatus 10 according to an embodiment, a communication module for communicating with the server 20 or the like external apparatus and a communication module for communicating with the remote controller may be different from each other. For example, the electronic apparatus 10 may use an Ethernet modem or a Wi-Fi module to communicate with the external apparatus, and use a Bluetooth module to communicate with the remote controller.

In the electronic apparatus 10 according to an alternative embodiment, a communication module for communicating with the server 20 or the like external apparatus and a communication module for communicating with the remote controller may be the same with each other. For example, the electronic apparatus 10 may use the Bluetooth module to communicate with the external apparatus and the remote controller.

According to an embodiment, the wireless interface 122 may be built-in the electronic apparatus 10 or implemented as a dongle or a module and detachably connected to the connector of the electronic apparatus 10.

The electronic apparatus 10 may include a user input receiver 130.

The user input receiver 130 transmits various preset control instructions or unrestricted information to the processor 150 in response to a user input.

The user input receiver 130 may include various input means for receiving a user's input.

According to an embodiment, the user input receiver 130 may include a keypad (or an input panel) including a power key, a numeral key, a menu key or the like buttons provided in the electronic apparatus 10.

According to an embodiment, the user input receiver 130 includes an input device that generates a command/data/information/signal previously set to remotely control the electronic apparatus 10 and transmits it to the electronic apparatus 10. The input device may for example include a remote controller, a game console, a keyboard, a mouse, etc. and receive a user input as separated from the electronic apparatus 10.

The remote controller may include at least one button for receiving a user's input. According to an embodiment, the remote controller may include a touch sensor for receiving a user's touch input and/or a motion sensor for detecting the remote controller's own motion caused by a user. According to an embodiment, the input device includes a terminal such as a smartphone in which a remote-control application is installed. In this case, the input device can receive a user's touch input through the touch screen.

The input device is used as an external apparatus that performs wireless communication with the main body of the electronic apparatus 10, in which the wireless communication is based on Bluetooth, IrDA, RF communication, WLAN, or Wi-Fi direct.

According to an embodiment, the user input receiver 130 may include a voice input unit for receiving a voice/sound uttered by a user. The voice input unit may be implemented as a microphone capable of receiving a user's voice, and the microphone may be provided in the electronic apparatus 10, provided separately from the electronic apparatus 10, or provided in another device, for example, a remote controller separated from the electronic apparatus 10.

According to an embodiment, the user input receiver 130 may include a motion detector that detects a user's hand motion, i.e., a hand gesture (hereinafter, referred to as a 'gesture'). The motion detector of the electronic apparatus 10 may output data by detecting the moving distance, the moving speed, the area of a moving region, etc. of a hand.

According to an embodiment, the electronic apparatus 10 may receive a user's input for changing the layout of the multi-view screen through the user input receiver 130. Here, a user's input for changing the layout may be received in various ways such as changing the priority of the plurality of pieces of content, i.e., the multi-view target, changing the layout of the plurality of pieces of content on the screen, or changing the position or size of a display region.

The electronic apparatus 10 may include a storage 140.

The storage 140 may be configured to store various pieces of data of the electronic apparatus 10.

The storage 140 may be implemented by a nonvolatile memory (or a writable read only memory (ROM)) which can retain data even though the electronic apparatus 10 is powered off, and mirror changes. That is, the storage 140 may include one among a flash memory, an HDD, an erasable programmable ROM (EPROM) or an electrically erasable programmable ROM (EEPROM). The storage 140 may further include a volatile memory such as a dynamic random-access memory (DRAM) or a static random-access memory (SRAM), of which reading or writing speed for the electronic apparatus 10 is faster than that of the nonvolatile memory.

Data stored in the storage 140 may for example include not only an OS for driving the electronic apparatus 10 but also various programs, applications, image data, appended data, etc. executable on the OS.

Specifically, the storage 140 may be configured to store a signal or data input/output corresponding to operations of the elements under control of the processor 150. The storage 140 may be configured to store a control program for controlling the electronic apparatus 10, an application provided by the manufacturer or downloaded from the outside, a relevant UI, graphics or images for providing the UI, user information, documents, databases, or the concerned data.

According to an embodiment, the storage 140 may be configured to store a TV application or a TV client as a program for operating the electronic apparatus 10 as a TV, and a VOD application as a program for reproducing content received from the server 20 and the like external apparatus.

According to an embodiment, an image displayed in the electronic apparatus 10 may be based on data stored in a flash memory, a hard disk, or the like nonvolatile storage 140. The storage 140 may be provided inside or outside the electronic apparatus 10, and the storage 140 provided outside may be connected to the electronic apparatus 10 via the wired interface 121.

According to an embodiment of the disclosure, the term 'storage' is defined to include the storage 140, the ROM (not shown) in the processor 150, a RAM (not shown) or a memory card (not shown, e.g., a micro-SD card, a memory stick, etc.) mountable to the electronic apparatus 10.

The electronic apparatus 10 may include a processor 150.

The processor 150 performs control for operating general elements of the electronic apparatus 10. The processor 150 may include a control program (or an instruction) to perform such a control operation, a nonvolatile memory in which the control program is installed, a volatile memory to which at least a part of the installed control program is loaded, and at least one of general-purpose processors such as a microprocessor, an application processor or a central processing unit (CPU) that executes the loaded control program.

The processor 150 may include a single-core processor, a dual-core processor, a triple-core processor, a quad-core processor, or the like multiple-core processor. The processor 150 may include a plurality of processors, for example, a main processor and a sub processor that operates in a sleep mode (e.g., when the display apparatus is supplied with only standby power and does not serve to display an image). Further, the processor, the ROM, and the RAM are connected to one another through an internal bus.

According to an embodiment, the processor 150 may include an image processor that performs various preset processes with respect to a content signal received from sources. The processor 150 outputs an output signal generated or combined by performing an image process to the display 110, so that an image corresponding to an image signal can be displayed on the display 110.

The image processor includes a decoder for decoding an image signal to have an image format of the electronic apparatus 10.

According to an embodiment, the decoder may for example be implemented by an H.264/AVC decoder, but not limited thereto. In other words, the video decoder in this embodiment may for example be implemented by a moving picture experts group (MPEG) decoder, a high efficiency video codec (HEVC) decoder, or the like decoders corresponding to various compression standards.

The decoder may be implemented as a hardware decoder or a software decoder.

According to an embodiment, the electronic apparatus 10 may include a plurality of decoders. Here, the plurality of decoders provided in the electronic apparatus 10 may be each implemented as the hardware decoder or the software decoder.

The electronic apparatus 10 may include a plurality of decoders, for example, a total of four decoders such as one high efficiency video codec (HEVC) decoder capable of decoding an 8K ultra high definition (UHD) image, one H.264/AVC decoder capable of decoding a 4K UHD image, and two H.264/AVC decoders capable of decoding a full high definition (FHD) image. However, this embodiment is merely an example, and there are no limits to the number and/or types of decoders provided in the electronic apparatus 10 according to the disclosure.

According to an embodiment, the electronic apparatus 10 may be implemented to display the plurality of pieces of content corresponding to the number of decoders by the multi-view streaming.

The image processor may include a scaler configured to adjust an image signal to match the output format of the display 110.

According to an embodiment, the scaler may operate as an output buffer to set the maximum resolution of the image displayed on the display 110 as hardware resources, i.e., resources.

In the electronic apparatus 10 according to an embodiment of the disclosure, the decoder and the scaler may identify the state of available resources for processing data so that the electronic apparatus 10 can display images of a plurality of pieces of content by the multi-view streaming. However, the factors of identifying the state of available resources in the electronic apparatus 10 according to the disclosure are not limited to the configuration of the image processor such as the decoder and the scaler, but may for example further include a network bandwidth or the like.

Further, there are no limits to the kinds of content to be processed by the image processor according to the disclosure. For example, the content to be processible in the image processor may include not only a moving picture like a video, but also a picture of joint photographic experts group (JPEG) file, a still image of a background, and a menu item of a UI, etc.

Here, there are no limits to the kinds of video processing process performed in the image processor of the disclosure. For example, the image processor may for example perform at least one of various processes such as de-interlacing for converting an interlaced broadcast signal into a progressive broadcast signal, noise reduction for improving image quality, detail enhancement, frame refresh rate conversion, line scanning, etc.

According to an embodiment, the image processor may be implemented by a video board including circuit elements such as various chipsets for performing respective processes, a memory, electronic parts, wirings, etc. which are mounted on to a printed circuit board (PCB). In this case, the processor 150 including a tuner and an image processor of the electronic apparatus 10 may be provided on a single video board. Of course, this is merely an example, and they may be arranged on a plurality of PCBs connecting and communicating with each other.

In the electronic apparatus 10 according to an embodiment of the disclosure, the processor 150 may process a broadcast signal to display an image of a predetermined channel based on that signal. Further, the processor 150 may process a signal received from the server 20 or the like external apparatus through the interface 120 so as to display an image of predetermined content based on that signal.

According to an embodiment, the processor 150 may be implemented as included in the main SoC mounted to the PCB internally provided in the electronic apparatus 10.

The control program may include a program(s) achieved by at least one of a BIOS, a device driver, an OS, a firmware, a platform, or an application. According to an exemplary embodiment, the application program may be previously installed or stored in the electronic apparatus 10 when the electronic apparatus 10 is manufactured, or may be installed in the electronic apparatus 10 on the basis of application data received from the outside when it is required in the future. The application data may for example be downloaded from an external server such as an application market to the electronic apparatus 10. Such an external server is merely an example of the computer program product according to the disclosure, but not limited thereto.

The control program may be recorded in a storage medium readable by a machine such as a computer. The machine-readable storage medium may be provided in the form of a non-transitory storage medium or a non-volatile storage medium. Here, the term 'non-transitory storage medium' means a tangible device and does not include a signal (e.g., an electromagnetic wave), and this term does not distinguish between a case where data is semi-permanently stored in the storage medium and a case where data is temporarily stored. For example, the 'non-transitory storage medium' may include a buffer in which data is temporarily stored.

Figure 5:
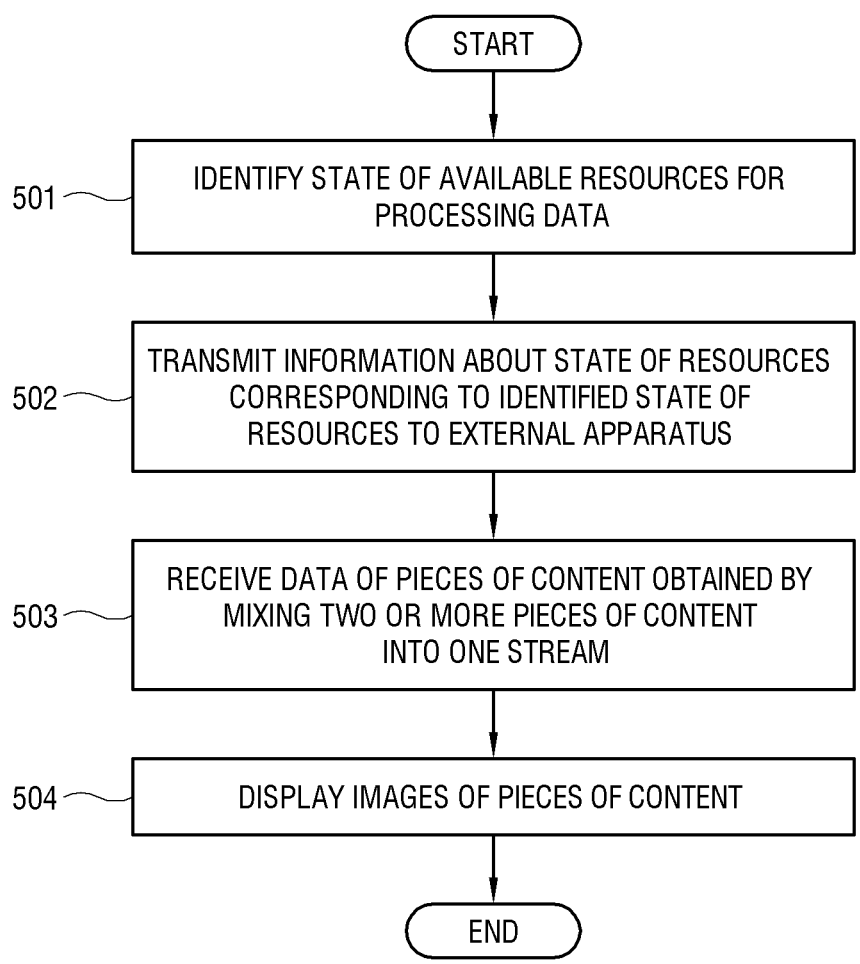
FIG. 5 is a flowchart showing control operations of performing multi-view streaming corresponding to a state of resources in an electronic apparatus according to an embodiment of the disclosure.

FIG. 5 is a flowchart showing control operations of performing multi-view streaming corresponding to the state of resources in an electronic apparatus according to an embodiment of the disclosure.

According to an embodiment of the disclosure, the processor 150 of the electronic apparatus 10 may receive data of a plurality of pieces of content from the server 20 or the like external apparatus through the interface 120, and processes the received data to control images based on the plurality of pieces of content to be displayed on the display 110. Here, the processor 150 may receive the data of the plurality of pieces of content by a multi-video streaming method, and control the images of the plurality of pieces of content to be displayed, as shown in FIG. 1, on one screen of the display 110 by the multi-views.

The processor 150 may, as shown in FIG. 5, identify the state of available resources for processing the data of the plurality of pieces of content (501). Here, the state of available resources may be identified based on the hardware resources and/or the software resources usable for processing data, i.e., the capacity of available resources for image processing in the electronic apparatus 10. For example, the state of available resources may be identified based on the number and types of decoders and/or scalers provided in the electronic apparatus 10. Alternatively, the state of available resources may be identified based on the network bandwidth assigned to the interface 120.

The processor 150 may transmit information about the state of resources to the external apparatus, i.e., the server 20 based on the state of resources identified in the operation 501 (502). The processor 150 may transmit the information about the state of resources to the external apparatus, as it is identified that the capacity of resources required to process the data of the plurality of pieces of content, i.e., a total amount of resources needed for processing the data of the plurality of pieces of content is greater than the available resources of the electronic apparatus 10.

Based on the received information about the state of resources, the server 20 may mix or merge two or more pieces of content among the plurality of pieces of content targeted for the multi-view.

The processor 150 may, from the server 20, i.e., from the external apparatus, receive the data of the plurality of pieces of content, which are obtained by mixing two or more pieces of content among the plurality of pieces of content targeted for the multi-view into one stream, based on the information about the state of resources transmitted in the operation 502 (503).

According to an embodiment, the external apparatus to which the information about the state of resources is transmitted and the external apparatus which provides the mixed data of the plurality of pieces of content may be the same apparatus, i.e., the single server 20.

According to an alternative embodiment, the external apparatus to which the information about the state of resources is transmitted and the external apparatus which provides the mixed data of the plurality of pieces of content may be different apparatuses. For example, the electronic apparatus 10 may, as shown in FIG. 3, transmit the information about the state of resources to the first server 21, and receive the mixed data of the plurality of pieces of content from the second server 22.

The processor 150 may, based on the data received in the operation 503, control an image of the plurality of pieces of content, which is obtained by mixing two or more among the plurality of pieces of content targeted for the multi-view, to be displayed on the display 110 (504).

According to an embodiment, the foregoing operations of the processor 150 may be implemented by a computer program stored in the computer program product (not shown) provided separately from the electronic apparatus 10.

In this case, the computer program product includes a non-transitory or non-volatile memory in which an instruction corresponding to a computer program is stored, and a processor. The instruction may be executed by the processor to identify the state of available resources for processing data, transmit the information about the state of resources to the external apparatus so that two or more pieces of content among the plurality of pieces of content can be mixed into one stream based on the identified state of resources, and receive the mixed data of the plurality of pieces of content.

Therefore, the electronic apparatus 10 may download and execute a computer program stored in a separate computer program product, and perform the operations of the processor 150.

Figure 6:
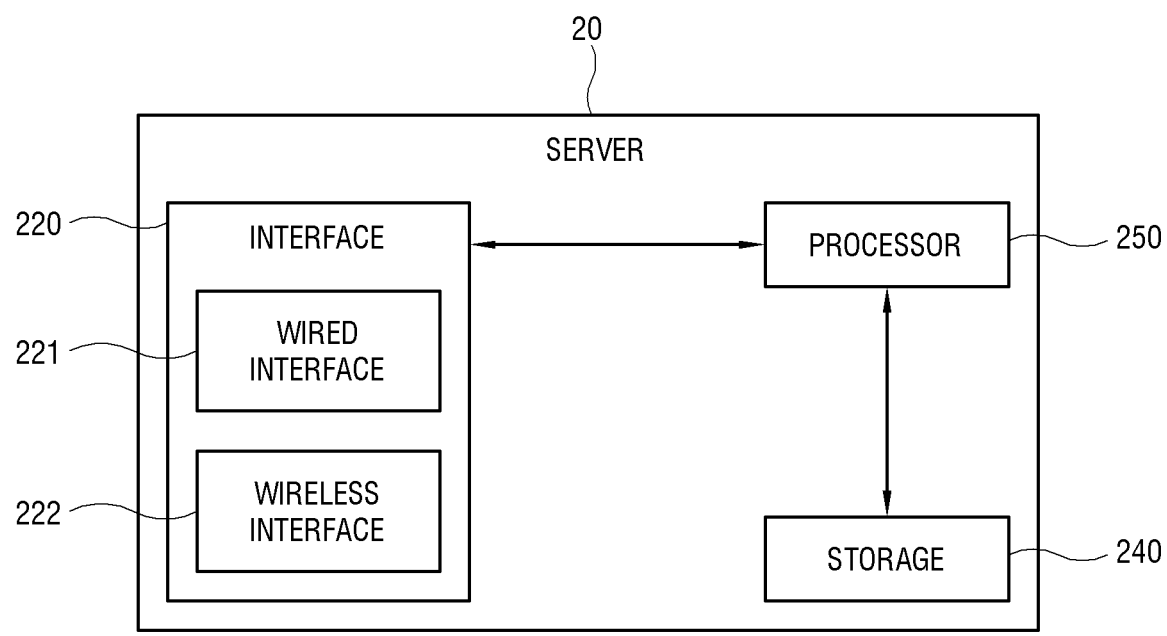
FIG. 6 is a block diagram of a server according to an embodiment of the disclosure.

FIG. 6 is a block diagram of a server according to an embodiment of the disclosure.

However, the elements of the server 20 according to an embodiment of the disclosure, shown in FIG. 6, are a merely an example, and a server according to another embodiment may be implemented to include elements different from those shown in FIG. 6. In other words, the server 20 according to the disclosure may be implemented to include another element in addition to those shown in FIG. 6, or exclude or change at least one of the elements shown in FIG. 6. Although FIG. 6 shows the elements of the single server 20 by way of example, there may be provided a plurality of servers according to the disclosure, and therefore the first server 21, the second server 22 and the third server 23 may be implemented to include the elements shown in FIG. 6.

Among the elements of the server 20, the element having the same name as that of the electronic apparatus 10 may be implemented equally, and thus repetitive descriptions thereof will be omitted.

The server 20 according to an embodiment of the disclosure may, as shown in FIG. 6, include an interface 220.

The interface 220 allows the server 20 to communicate with various external apparatuses such as the electronic apparatus 10 by the wired or wireless communication method. The interface 220 includes a wired and/or wireless communication module, and may be implemented as a circuitry that includes a communication module (S/W modules, chips, etc.) corresponding to a predetermined communication protocol.

When there may be a plurality of servers 20, each of the servers 21, 22 and 23 may communicate with another server and the electronic apparatus 10 through its own interface 220. For example, the first server 21 (i.e., the content server) provided as a cloud server may communicate with another sever, for example, the second server 22 or the third server 23 provided as the MEC server through its own interface 220.

The server 20 may include a storage 240.

The storage 240 is configured to store various pieces of data of the server 20.

According to an embodiment, the storage 240 may be configured to store various pieces of content to be provided to external apparatuses such as the electronic apparatus 10.

According to an embodiment, the server 20 may store a user's account information. The user's account information may include security information. Further, the account information may further include information about an electronic apparatus using a corresponding user's account, for example, the information about the electronic apparatus 10.

The server 20 may include a processor 250.

The processor 250 performs control for operating general elements of the server 20.

Figure 7:
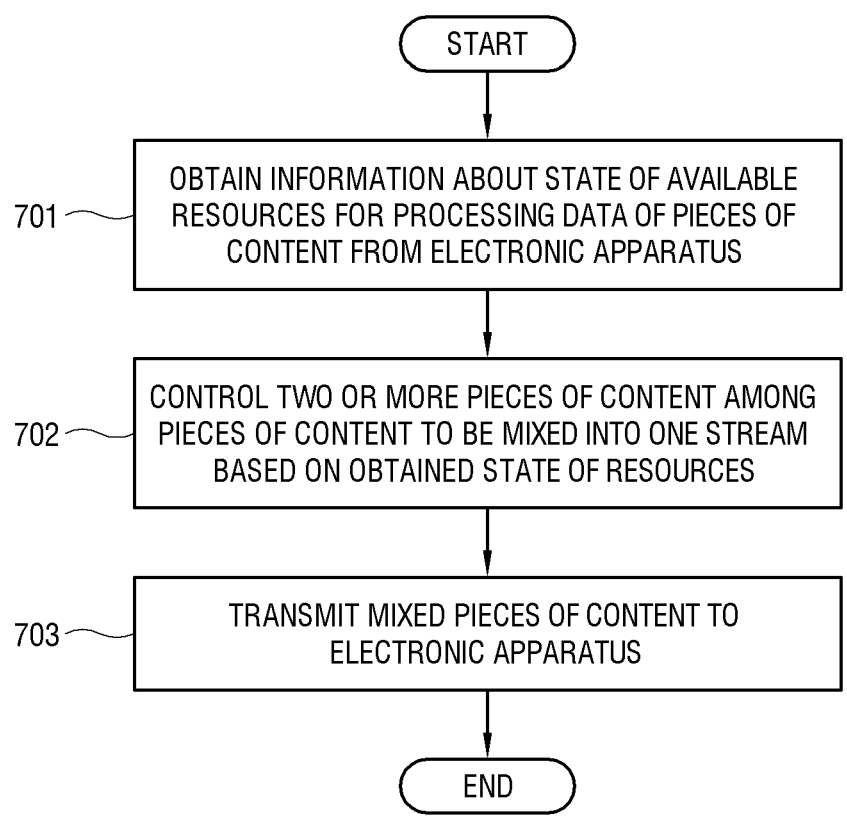
FIG. 7 is a flowchart showing control operations of performing multi-view streaming corresponding to a state of resources in a server according to an embodiment of the disclosure.

FIG. 7 is a flowchart showing control operations of performing multi-view streaming based on a state of resources in a server according to an embodiment of the disclosure.

According to an embodiment of the disclosure, the processor 250 of the server 20 may transmit the data of the plurality of pieces of content to the electronic apparatus 10 through the interface 220. Here, the processor 250 may transmit the data of the plurality of pieces of content by a multi-media streaming method, and the images of the plurality of pieces of content may, as shown in FIG. 1, be displayed as the multi-views on one screen of the display 110 in the electronic apparatus 10.

The processor 250 may, as shown in FIG. 7, obtain the information about the state of available resources for processing the data of the plurality of pieces of content in the electronic apparatus 10 (701). Here, the state of available resources may be identified based on the capacity of available resources for image processing in the electronic apparatus 10, i.e., the hardware resources and/or the software resources data.

The processor 250 may control the multi-view targets, i.e., two or more pieces of content among the plurality of pieces of content to be mixed into one stream based on the information about the state of resources obtained in the operation 701 (702). For example, the processor 250 may mix or merge the multi-view targets, i.e., two pieces of content among four pieces of content into one file based on the state of resources of the electronic apparatus 10. Alternatively, the processor 250 may mix all the multi-view targets, i.e., four pieces of content into one file based on the state of resources of the electronic apparatus 10.

According to an embodiment, the processor 250 may control two or more pieces of content among the plurality of pieces of content to be mixed into one stream, based on the priority given for each of the plurality of pieces of content.

According to an embodiment, the processor 250 may further reduce the capacity of content with respect to at least one among the plurality of pieces of content, based on the obtained information about the state of resources. For example, processing of adjusting the resolution or changing the compression type or the decoding type may be performed with respect to content, which has relatively large capacity, among the plurality of pieces of content. Alternatively, processing for changing the decoding type may be performed with respect to content, which has been encoded by a decoding type not supported by the electronic apparatus 10, among the plurality of pieces of content.

The processor 250 may transmit the mixed data of the plurality of pieces of content in the operation 703 to the electronic apparatus 10 (703). Because the plurality of pieces of content transmitted in this way has been processed based on the state of available resources of the electronic apparatus 10, the plurality of pieces of content are normally displayed on the display 110 of the electronic apparatus 10 without distortion by the multi-view method.

In the embodiment of FIG. 7, a plurality of servers 20 are is implemented as the MEC system as described above with reference to FIG. 3, and operate as follows.

As the cloud server, the first server 21 (or the content server) may obtain the information about the state of available resources of the electronic apparatus 10 in the operation 701. The first server 22 may transmit a signal, i.e., a command to the second server 22 (or the MEC server) provided as the network edge, so that the second server 22 can control two or more pieces of content among the plurality of pieces of content to be mixed into one stream in the operation 702. The second server 22 may transmit the mixed data of the plurality of pieces of content to the electronic apparatus 10 in the operation 703.

Below, embodiments that the electronic apparatus according to the disclosure performs multi-view streaming for the plurality of pieces of content will be described with reference to the accompanying drawings.

Figure 8:
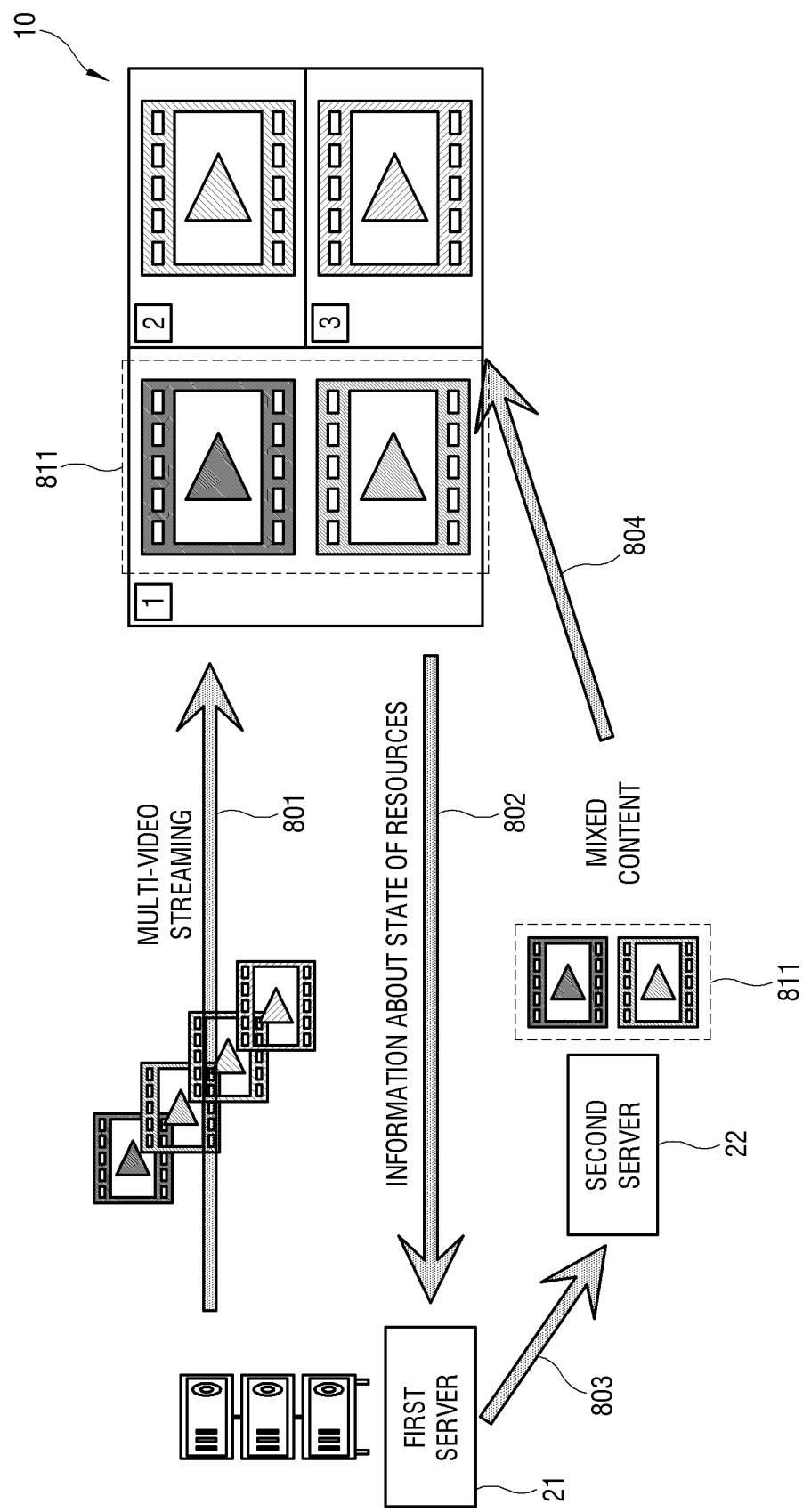
FIG. 8 is a view showing an example that an electronic apparatus according to an embodiment of the disclosure displays a plurality of pieces of content mixed.

FIG. 8 is a view showing an example that an electronic apparatus according to an embodiment of the disclosure displays a plurality of pieces of content mixed.

As shown in FIG. 8, the electronic apparatus 10 may receive the data of the plurality of pieces of content from the external apparatus, for example, the first server 21 (i.e., the content server) by the multi-video streaming (801). Here, the first server 21 ma transmit information indicating that a predetermined number, for example, four pieces of content are targeted for transmission, i.e., indicating the multi-video streaming to the electronic apparatus 10, and the transmitted information may include information about each piece of content, for example, the decoding or compression type, resolution, etc. of each content.

The electronic apparatus 10 may identify the state of available resources for processing the data of the plurality of pieces of content, and transmit the identified information about the state of resources to the first server 21 (802).

Here, the information about the state of resources may be a response to the information received in the operation 801, and the information about the state of resources may be transmitted to the first server 21 when the capacity of the resources required to process the data of the plurality of pieces of content exceeds the state of available resources of the electronic apparatus 10.

The transmitted information may, for example, include a message informing a state that the resources of the electronic apparatus 10 are insufficient to perform the multi-view streaming for the plurality of pieces of content. Alternatively, the information about the state of resources may include a message informing a state that the resources of the electronic apparatus 10 correspond to three decoders.

According to an embodiment, the electronic apparatus 10 may further transmit a message making a request for stopping the multi-video streaming of the operation 801 based on the identified state of resources.

The first server 21 may control the second server 22 (i.e., the MEC server) to generate mixed content by mixing two or more pieces of content among the plurality of pieces of content into one stream, based on the information about the state of resources obtained from the electronic apparatus 10 (803).

According to an embodiment, the first server 21 identifies that the electronic apparatus 10 lacks the available resources and is unable to reproduce the plurality of pieces of content by the multi-view, based on the obtained information about the state of resources, and controls the second server 22 to merge, i.e., mix two pieces of content into the mixing content 811 corresponding to the insufficient available resources.

The data of the generated mixing content 811 may be transmitted from the second server 22 to the electronic apparatus 10. Here, the second server 22 that provides the data of the mixing content may be referred to as the external apparatus with respect to the first server 21.

In addition, the electronic apparatus 10 may display a total of three images corresponding to one piece of mixing content 811 and two pieces of original content among the plurality of pieces of content targeted for the multi-view on the screen area of the display 110 by the multi-view. Here, the data of original content may be transmitted from the first server 21 to the electronic apparatus 10, or may be provided from another server that can operates as the second server 22 or the MEC server, for example, from the third server 23.

Figure 9:
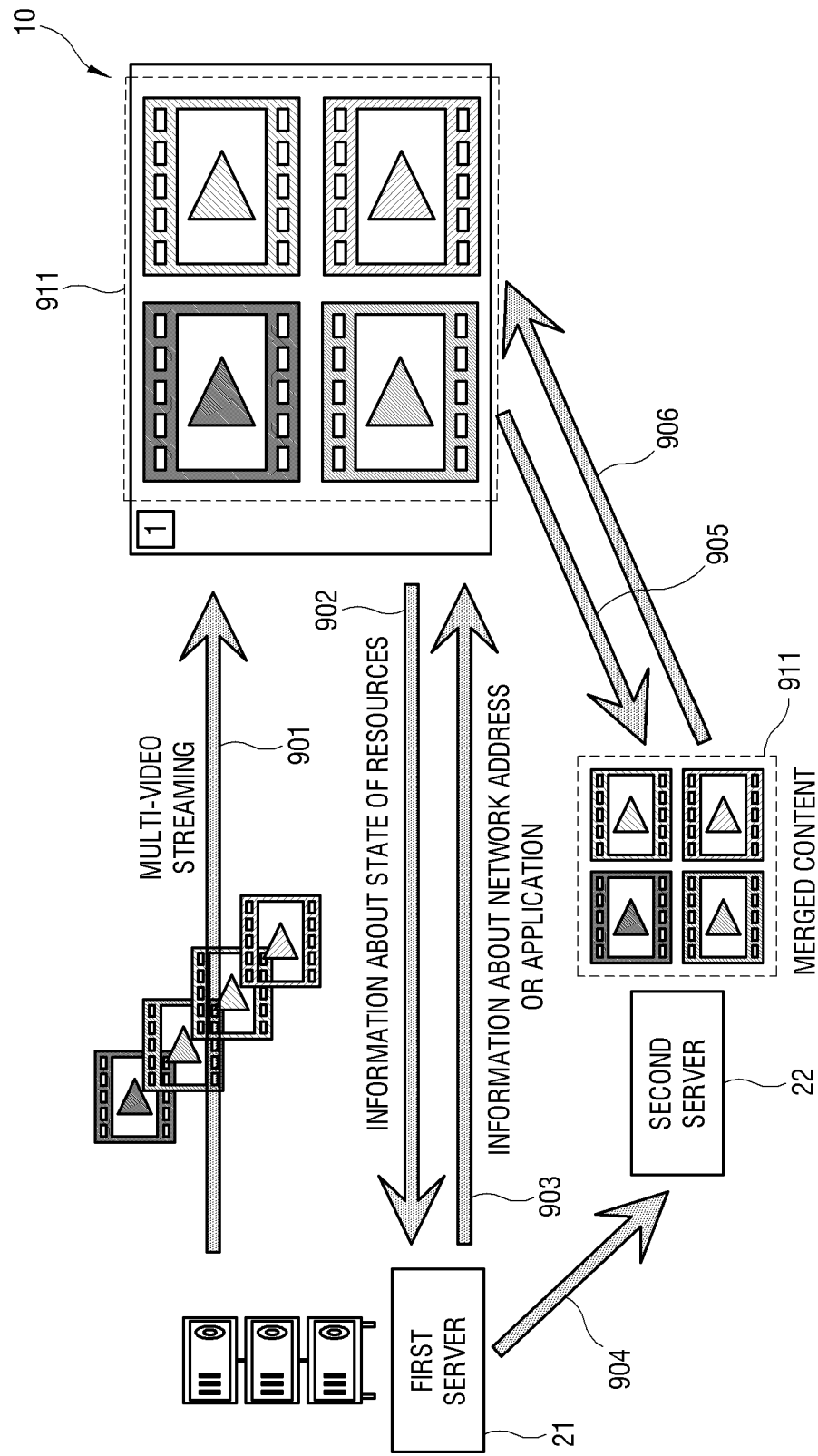
FIG. 9 is a view showing another example that an electronic apparatus according to an embodiment of the disclosure displays a plurality of pieces of content mixed.

FIG. 9 is a view showing another example that an electronic apparatus according to an embodiment of the disclosure displays a plurality of pieces of content mixed.

As shown in FIG. 9, the electronic apparatus 10 may receive the data of the plurality of pieces of content from the external apparatus, for example, the first server 21 (i.e., the content server) by the multi-video streaming (901). Here, the first server 21 ma transmit information indicating that a predetermined number, for example, four pieces of content are targeted for transmission, i.e., indicating the multi-video streaming to the electronic apparatus 10, and the transmitted information may include information about each piece of content, for example, the decoding or compression type, resolution, etc. of each content.

The electronic apparatus 10 may identify the state of available resources for processing the data of the plurality of pieces of content, and transmit the identified information about the state of resources to the first server 21 (902).

Here, the information about the state of resources may be a response to the information received in the operation 901, and the information about the state of resources may be transmitted to the first server 21 when the capacity of the resources required to process the data of the plurality of pieces of content exceeds the state of available resources of the electronic apparatus 10.

The transmitted information may, for example, include a message informing a state that the resources of the electronic apparatus 10 are insufficient to perform the multi-view streaming for the plurality of pieces of content.

According to an embodiment, the electronic apparatus 10 may further transmit a message making a request for stopping the multi-video streaming of the operation 901 based on the identified state of available resources The first server 21 may identify that the electronic apparatus 10 lacks the available resources and is unable to reproduce the plurality of pieces of content by the multi-view, based on the information about the state of resources obtained the electronic apparatus 10, and transmit information about the external apparatus, i.e., the server capable of providing the mixing content by mixing the multi-view targets, i.e., two or more pieces of content among the plurality of pieces of content into one stream to the electronic apparatus 10. Here, the transmitted information may include information about a network address (e.g., URL) or an application (e.g., application ID) of the second server 22 as the external apparatus capable of providing the mixing content.

According to an embodiment, the first server 21, i.e., the content server may control a predetermined MEC server, e.g., the second server to generate mixing content 911 by mixing four pieces of content into one stream corresponding to the insufficient available resources (904). Although FIG. 9 shows an example of mixing four pieces of content into one, any number, for example, two or three pieces of content among the plurality of pieces of content may be mixed into one stream according to the disclosure.

The electronic apparatus 10 may use the network address or application received from the first server 21 to access the second server 22 and request the mixed data of the plurality of pieces of content to the second server 22 (905).

The second server 22 may transmit the data of the mixing content 911 to the electronic apparatus 10 in response to the request of the electronic apparatus 10 (906). In other words, the data of the plurality of pieces of content may be provided to the electronic apparatus 10 by one streaming.

For example, the electronic apparatus 10 may use the received network address to access the second server 22, thereby receiving the mixed data of the plurality of pieces of content from the second server 22. Alternatively, the electronic apparatus 10 may execute an application corresponding to the received information about the application to access the second server 22, thereby receiving a plurality of pieces of mixed data from the second server 22.

In addition, the electronic apparatus 10 may display the image of the mixing content 911 corresponding to the plurality of pieces of content targeted for the multi-view on the screen of the display 110. Here, the electronic apparatus 10 receives the mixing content 911 of one stream instead of the plurality of pieces of content, but the mixing content 911 corresponds to the plurality of pieces of content, thereby allowing a user to view the plurality of pieces of content by the multi-view streaming.

Figure 10:
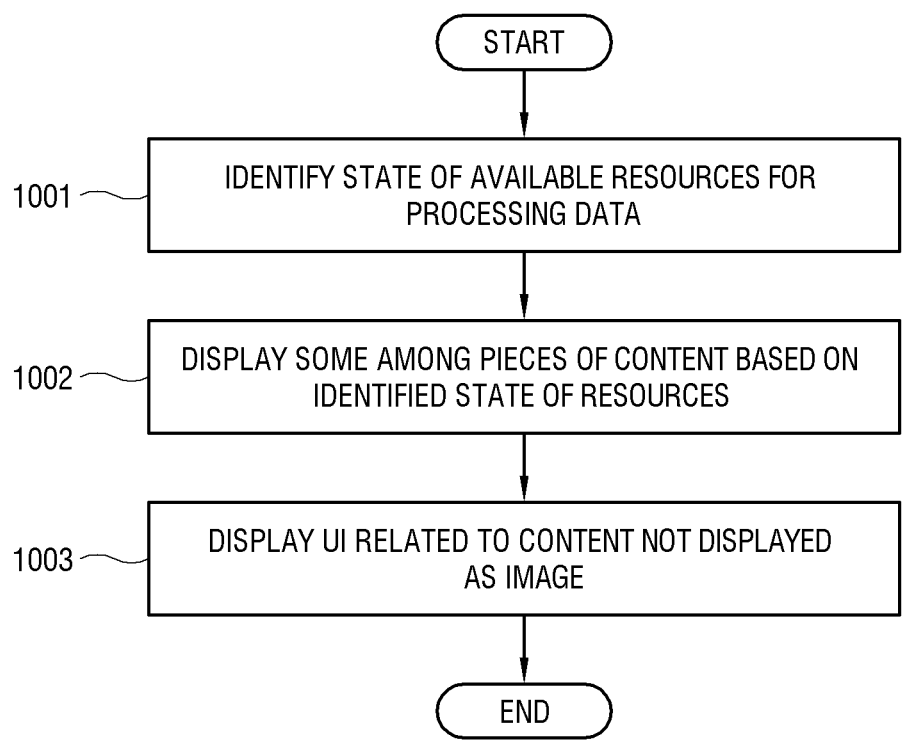
FIG. 10 is a flowchart showing control operations of performing multi-view streaming corresponding to a state of resources in an electronic apparatus according to another embodiment of the disclosure.

FIG. 10 is a flowchart showing control operations of performing multi-view streaming corresponding to a state of resources in an electronic apparatus according to another embodiment of the disclosure.

The processor 150 of the electronic apparatus 10 may receive the data of the plurality of pieces of content targeted for the multi-view streaming from the server 20 or the like external apparatus through the interface 120.

The processor 150 may, as shown in FIG. 10, identify the state of available resources for processing the data of the plurality of pieces of content (1001). Here, the state of available resources may be identified based on the capacity of available resources for image processing in the electronic apparatus 10, i.e., the hardware resources and/or the software resources usable for processing the data, for example, the number, types, etc. of decoders and/or scalers provided in the electronic apparatus 10.

The processor 150 may control images of some among the plurality of pieces of content targeted for the multi-view streaming to be displayed on the display 110, based on the state of resources identified in the operation 1001 (1002). For example, when four pieces of content are targeted for the multi-view streaming but three decoders are provided in the electronic apparatus 10, images of three pieces of content the display 110 among the four pieces of content may be displayed on the display 110.

Here, the processor 150 may control images of some among the plurality of pieces of content to be displayed, based on identification that the capacity of resources required to process the data of the plurality of pieces of content exceeds the state of available resources of the electronic apparatus 10.

According to an embodiment, the processor 250 may control the images of some among the plurality of pieces of content to be displayed in a predetermined order. For example, the images of the content corresponding to the first, second and third priority according to the priorities among four pieces of content may be displayed on the display 110.

Meanwhile, the processor 150 may control the display 110 to further display a UI related to the content not displayed as an image in the operation 1002, for example, the content of the fourth priority the display 110 (1003). Here, the display UI may include a menu item, a thumbnail image, a message, etc., which will be described in more detail later in the following embodiments with reference to FIGS. 12 to 14.

Figure 11:
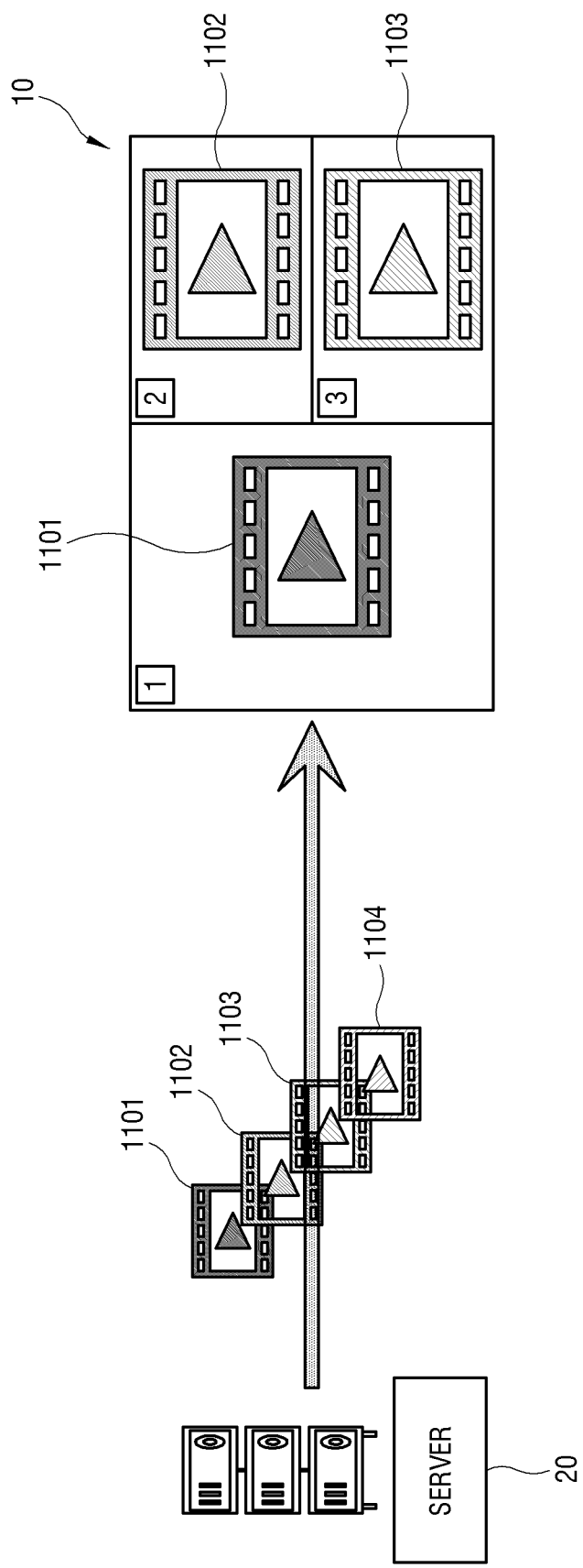
FIG. 11 is a view showing an example of displaying some pieces of content among a plurality of pieces of content in an electronic apparatus according to another embodiment of the disclosure.

FIG. 11 is a view showing an example of displaying some pieces of content among a plurality of pieces of content in an electronic apparatus according to another embodiment of the disclosure.

As shown in FIG. 11, the electronic apparatus 10 may receive data of a plurality of pieces of content 1101, 1102, 1103 and 1104 from the external apparatus, for example, the server 20 (i.e., the content server) by the multi-video streaming.

The electronic apparatus 10 may identify the state of available resources for processing the data of the plurality of pieces of content 1101, 1102, 1103 and 1104, and display images of some pieces among the plurality of pieces of content 1101, 1102, 1103 and 1104 on the display 110 based on the identified state of resources. For example, when three decoders are identified as the identified available resources, three pieces of high priority content 1101, 1102 and 1103 may, as shown in FIG. 11, be reproduced and displayed on the display 110 of the electronic apparatus 10 based on the range of available resources, in other words, the state of available resources.

Figure 12:
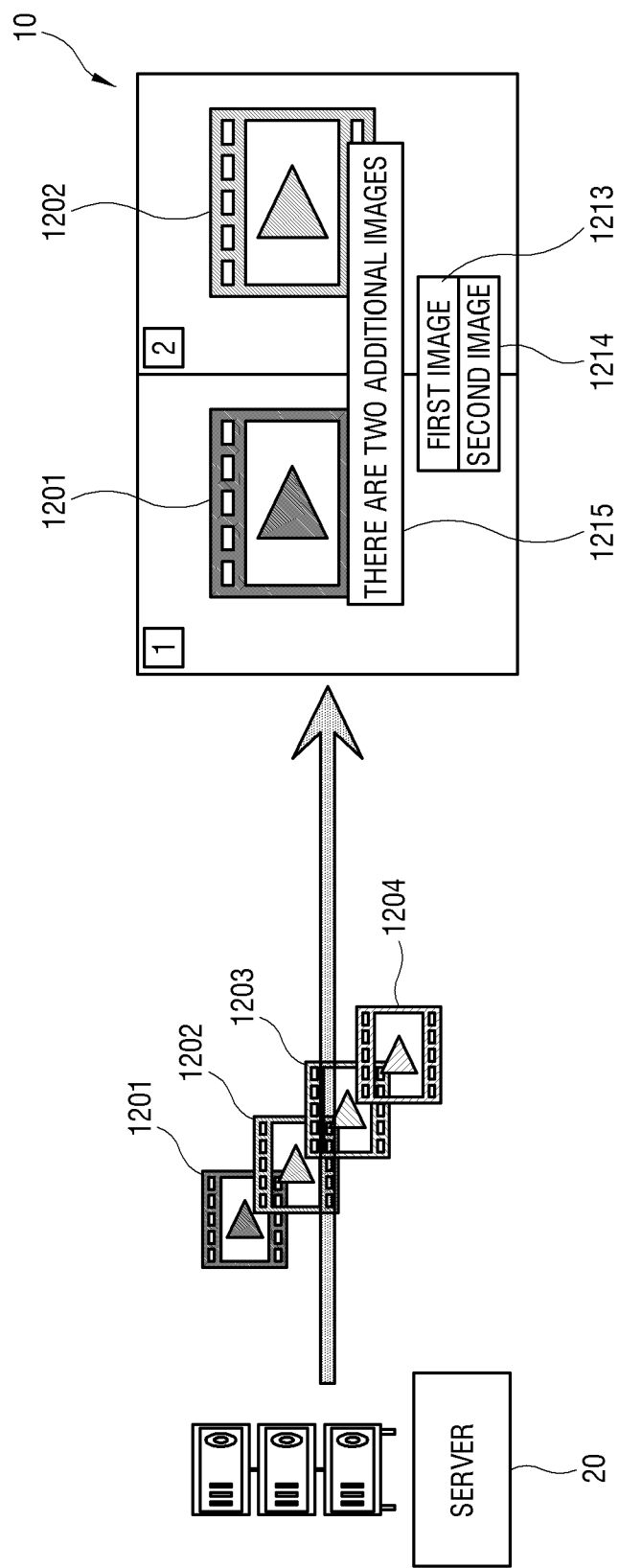
FIG. 12 is a view showing an example of displaying a plurality of pieces of content together with a user interface (UI) in an electronic apparatus according to another embodiment of the disclosure.

FIG. 12 is a view showing an example of displaying a plurality of pieces of content together with a UI in an electronic apparatus according to another embodiment of the disclosure.

As shown in FIG. 12, the electronic apparatus 10 may receive data of a plurality of pieces of content 1201, 1202, 1203 and 1204 from the external apparatus, for example, the server 20 (i.e., the content server) by the multi-video streaming.

The electronic apparatus 10 may identify the state of available resources for processing the data of the plurality of pieces of content 1201, 1202, 1203 and 1204, and display images of some pieces among the plurality of pieces of content 1201, 1202, 1203 and 1204 on the display 110 based on the identified state of resources. For example, when two decoders are identified as the identified available resources, two pieces of high priority content 1201 and 1202 may, as shown in FIG. 12, be reproduced and displayed on the display 110 of the electronic apparatus 10 based on the state of available resources.

The electronic apparatus 10 may display a UI related to content 1203 and 1204 not displayed as images among the plurality of pieces of content targeted for the multi-view on the display 110.

According to an embodiment, the UI may, as shown in FIG. 12, include menu items 1213 and 1214 corresponding to the content 1203 and 1204 not displayed, and the electronic apparatus 10 may display a list of at least one menu item 1213 and 1214 on a certain area of the display 110. For example, the list of menu items 1213 and 1214 may be displayed being overlaid on the images of the plurality of pieces of content 1201 and 1202.

A user may select the menu item 1213 or 1214 in the displayed list, and, in response to the selection of any one menu item 1213, the electronic apparatus 10 may change the screen and display an image of content 1203 corresponding to the selected menu item 1213 as a full or partial screen on the display 110.

According to an embodiment, the UI may, as shown in FIG. 12, further include a message 1215 notifying that an additional image not being currently displayed on the screen is present.

Figure 13:
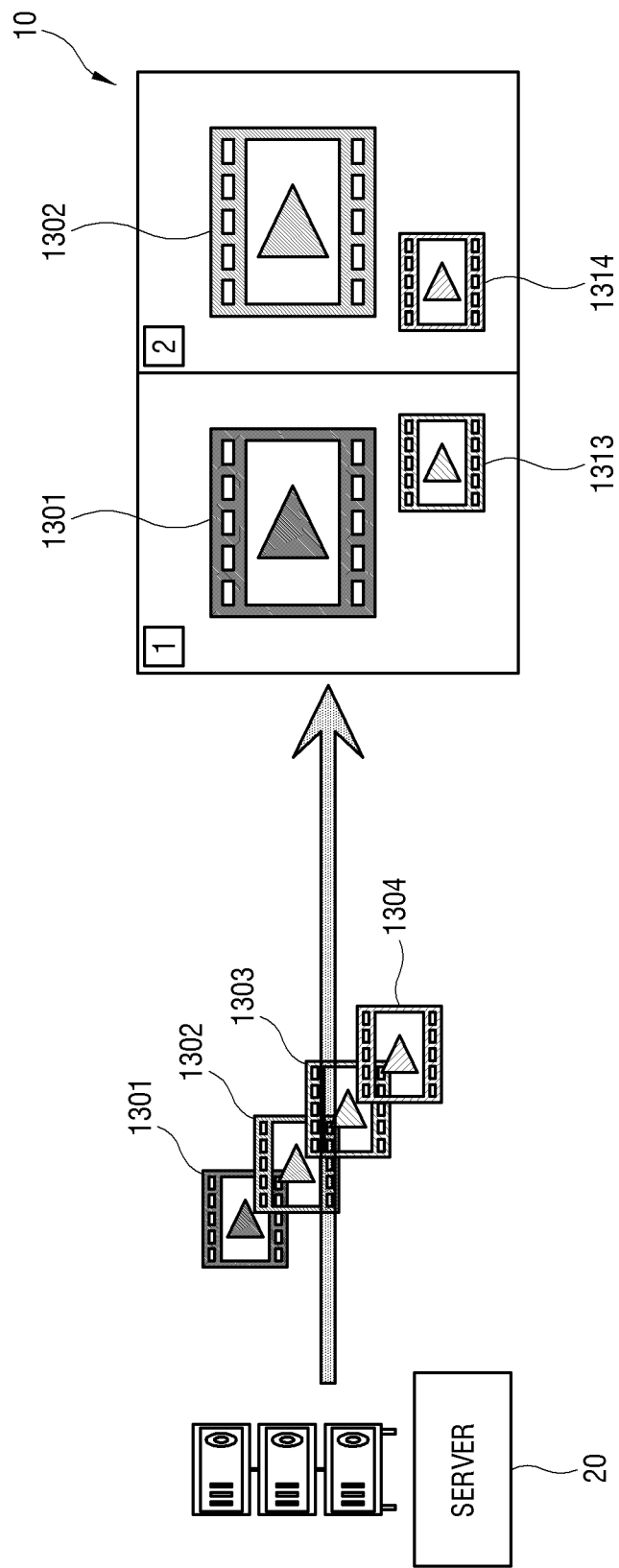
FIG. 13 is a view showing another example of displaying a plurality of pieces of content together with a UI in an electronic apparatus according to another embodiment of the disclosure.

FIG. 13 is a view showing another example of displaying a plurality of pieces of content together with a UI in an electronic apparatus according to another embodiment of the disclosure.

As shown in FIG. 13, the electronic apparatus 10 may receive data of a plurality of pieces of content 1301, 1302, 1303 and 1304 from the external apparatus, for example, the server 20 (i.e., the content server) by the multi-video streaming.

The electronic apparatus 10 may identify the state of available resources for processing the data of the plurality of pieces of content 1301, 1302, 1303 and 1304, and display images of some pieces among the plurality of pieces of content 1301, 1302, 1303 and 1304 on the display 110 based on the identified state of resources. For example, when two decoders are identified as the identified available resources, two pieces of high priority content 1301 and 1302 may, as shown in FIG. 13, be reproduced and displayed on the display 110 of the electronic apparatus 10 based on the state of available resources.

The electronic apparatus 10 may display a UI related to content 1303 and 1304 not displayed as images among the plurality of pieces of content targeted for the multi-view on the display 110.

According to an embodiment, the UI may, as shown in FIG. 13, include thumbnail images 1313 and 1314 corresponding to the content 1303 and 1304 not displayed. For example, the thumbnail images 1313 and 1314 may be reproduced being overlaid on the images of the plurality of pieces of content 1301 and 1302.

A user may select the thumbnail images 1313 or 1314 in the displayed list, and, in response to the selection of any one thumbnail image 1313, the electronic apparatus 10 may change the screen and display an image of content 1303 corresponding to the selected thumbnail image 1313 as a full or partial screen on the display 110.

FIG. 14 is a view showing still another example of displaying a plurality of pieces of content together with a UI in an electronic apparatus according to another embodiment of the disclosure.

In the embodiment of FIG. 14, the plurality of pieces of content targeted for the multi-view may correspond to segments forming a multi-angle image such as a 360-degree 3D image (hereinafter referred to as a 3D image or a 360-degree image).

As shown in FIG. 14, the electronic apparatus 10 may receive data of a plurality of pieces of content 1401, 1402, 1403 and 1404 forming the multi-angle image from the external apparatus, for example, the server 20 (i.e., the content server) by the multi-video streaming. Here, the plurality of pieces of content 1401, 1402, 1403 and 1404 respectively corresponding to predetermined directions, for example, front, rear, right and left regions of the multi-angle image, respectively.

The electronic apparatus 10 may further receive direction information corresponding to the plurality of pieces of content 1401, 1402, 1403 and 1404 as content appended information from the server 20, respectively.

The electronic apparatus 10 may identify the state of available resources for processing the data of the plurality of pieces of content 1401, 1402, 1403 and 1404, and display images of some pieces among the plurality of pieces of content 1401, 1402, 1403 and 1404 on the display 110 based on the identified state of resources. For example, when two decoders are identified as the identified available resources, two pieces of high priority content 1401 and 1402 may, as shown in FIG. 14, be reproduced and displayed on the display 110 of the electronic apparatus 10 based on the state of available resources.

According to an embodiment, the electronic apparatus 10 may display a message or icons 1421 and 1422 informing the direction information of the displayed content 1401 and 1402, together with the images of content 1401 and 1402, based on the received content appended information.

The electronic apparatus 10 may display a UI related to content 1403 and 1404 not displayed as images among the plurality of pieces of content targeted for the multi-view on the display 110.

According to an embodiment, the UI may, as shown in FIG. 14, include thumbnail images 1413 and 1414 corresponding to the content 1403 and 1404 not displayed. For example, the thumbnail images 1413 and 1414 may be displayed being overlaid on the images of the plurality of pieces of content 1401 and 1402.

According to an embodiment, the electronic apparatus 10 may display a message or icons 1423 and 1424 informing the direction information of the content 1403 and 1404 not displayed, based on the received content appended information.

A user may select the thumbnail images 1413 or 1414 in the displayed list, and, in response to the selection of any one thumbnail image 1413, the electronic apparatus 10 may change the screen and display an image of content 1403 corresponding to the selected thumbnail image 1413 as a full or partial screen on the display 110.

Meanwhile, according to the disclosure, the case of displaying the UI showing the information, together with the image of content, based on the content appended information is not limited to the embodiment of displaying the multi-angle image as shown in FIG. 14.

In other words, according to an alternative embodiment, the images of the plurality of pieces of content may correspond to images of various views in broadcasting sports such as baseball or soccer, for example, a stadium field image, a seat image, a broadcasting booth image, a bench image, etc., respectively. Here, the electronic apparatus 10 may display the images of the plurality of pieces of content corresponding to various views, and a UI including a message or the like showing the view information of the images.

According to the foregoing embodiments, only a part of the multi-view content is displayed corresponding to the state of available resources to thereby reduce the load in operations of the electronic apparatus 10, and the UI informs a user of the content not displayed to thereby prevent a problem that the information is not transmitted to a user even though some pieces of the content is not displayed.

FIG. 15 is a flowchart showing control operations of performing multi-view streaming corresponding to a state of resources in an electronic apparatus according to still another embodiment of the disclosure.

The processor 150 of the electronic apparatus 10 may receive the data of the plurality of pieces of content targeted for the multi-view streaming from the server 20 or the like external apparatus through the interface 120.

The processor 150 may, as shown in FIG. 15, identify the state of available resources for processing the data of the plurality of pieces of content (1501). Here, the state of resources may be identified based on the capacity of available resources for image processing in the electronic apparatus 10, i.e., the hardware resources and/or the software resources usable for processing the data, for example, the number, types, etc. of decoders and/or scalers provided in the electronic apparatus 10.

The processor 150 may receive the data of the plurality of pieces of content from the server 20 or the like external apparatus based on the state of resources identified in the operation 1501 (1502)

According to an embodiment, when it is identified in the operation 1501 that the state of resources is sufficient to simultaneously reproduce the plurality of pieces of content targeted for the multi-view, the plurality of pieces of content may be multi-video streamed as original content from the server 20 to the electronic apparatus 10.

According to an alternative embodiment, when it is identified in the operation 1501 that the state of resources is insufficient to simultaneously reproduce the plurality of pieces of content targeted for the multi-view, data of a plurality of pieces of content, at least a part of which is processed corresponding to the insufficient resources, among the plurality of pieces of content may be transmitted from the server 20 to the electronic apparatus 10. Here, the processed content may include the mixing content obtained by mixing two or more among the plurality of pieces of content into one stream.

According to an embodiment, the external apparatus that originally provides the data of the plurality of pieces of content targeted for the multi-view may be different from the external apparatus that provides the processed content, for example, the mixed data of the plurality of pieces of content.

The processor 150 may arrange the plurality of pieces of content received in the operation 1502 in a given order on the screen of the display 110, thereby displaying the images of the plurality of pieces of content (1503). For example, the images of the plurality of pieces of content may be arranged in order and displayed on the regions of the display 110 according to the priority given for each piece of the content. Here, the priority information about the plurality of pieces of content may be received as being included as appended information in the data of the plurality of pieces of content.

The processor 150 may receive a user's input for changing a layout of a screen, on which the plurality of pieces of content targeted for the multi-view are arranged, through the user input receiver 130 (1504). Here, the user's input for changing the layout may include an input for changing the priorities of the plurality of pieces of content in the operation 1503 or changing the position or size of the screen region where the plurality of pieces of content are arranged.

The processor 150 may rearrange the plurality of pieces of content on the screen of the display 110 based on the layout changed by the user's input received in the operation 1504, thereby displaying the images of the plurality of pieces of content (1505).

FIG. 16 is a view showing an example that a plurality of pieces of content is arranged and displayed on a screen in an electronic apparatus according to still another embodiment of the disclosure.

As shown in FIG. 16, the electronic apparatus 10 may receive data of a plurality of pieces of content 1601, 1602, 1603 and 1604 from the external apparatus, for example, the server 20 (i.e., the content server) by the multi-video streaming.

The electronic apparatus 10 may identify the state of available resources for processing the data of the plurality of pieces of content 1601, 1602, 1603 and 1604, and display images of the plurality of pieces of content 1601, 1602, 1603 and 1604 on the display 110 based on the identified state of resources.

For example, when four pieces of content are targeted for the multi-view and four decoders are identified as the available resources, the images of all the plurality of pieces of content 1601, 1602, 1603 and 1604 may be displayed on the regions of the display 110 of the electronic apparatus 10 as shown in FIG. 16 based on the state of available resources.

According to an embodiment, the plurality of pieces of content 1601, 1602, 1603 and 1604 may be arranged on the screen of the display 110 based on a given order, so that their corresponding images can be displayed on the regions of the display 110, respectively.

For example, the content 1601 having the highest priority among the plurality of pieces of content 1601, 1602, 1603 and 1604 may be displayed in a first region 111 of the display 110, and then the pieces of content 1602, 1603 and 1604 may be arranged in order in second to third regions 112, 113 and 114, respectively.

FIG. 17 is a view showing an example that a plurality of pieces of content is rearranged and displayed on a screen in an electronic apparatus according to still another embodiment of the disclosure.

The electronic apparatus 10 may, as shown in FIG. 17, arrange the plurality of pieces of content 1701, 1702, 1703 and 1704 targeted for the multi-view in regions 111, 112, 113 and 114 of the display 110 in a given order, respectively.

The electronic apparatus 10 may receive a user's input for changing the layout of the screen while the plurality of pieces of content 1701, 1702, 1703 and 1704 are arranged on the screen.

The electronic apparatus 10 may arrange the plurality of pieces of content 1701, 1702, 1703 and 1704 in the regions 111, 112, 113 and 114 of the display 110 based on the received user's input. For example, in response to the reception of a user's input for giving the high priority, e.g., the first priority to the content 1703 having a predetermined low priority, the image of the content 1703 may be rearranged to the first region 111 of the display 110. Therefore, the image of the content 1701 displayed on the first region 111 may be rearranged to the third region 113 based on its relatively lowered priority.

In the foregoing embodiment of FIG. 17, the priority is given again for the content as an example of changing the layout. However, the user's input is not limited to the input for giving the priority again. For example, according to the disclosure, the user's input for changing the layout may include an input for changing the size or shape of the regions 111, 112, 113 and 114 of the display 110, or changing (increasing or decreasing) the number of regions.

According to the embodiments described above, a user can freely rearrange the multi-view screen by reflecting changes in reproduction environments, content's own characteristics, preferences, etc. through the function for changing the priority of the multi-view content.

According to an embodiment, methods according to various embodiments of the disclosure may be provided as involved in a computer program product. The computer program product may be traded as a product between a seller and a buyer. The computer program product may be distributed in the form of a machine-readable storage medium (for example, a compact disc read only memory (CD-ROM)) or may be directly or online distributed (for example, downloaded or uploaded) between two user apparatuses (for example, smartphones) through an application store (for example, Play Store™). In the case of the online distribution, at least part of the computer program product (e.g., a downloadable app) may be transitorily stored or temporarily produced in a machine-readable storage medium such as a memory of a manufacturer server, an application-store server, or a relay server.

Although a few exemplary embodiments of the disclosure have been described in detail, various changes may be made in these exemplary embodiments without departing from the scope defined in the appended claims.

What is claimed is:

1. An electronic apparatus comprising:
a display; and
a processor configured to:
receive information about a plurality of pieces of content from an external apparatus;
identify a state of resources of the electronic apparatus that are available for processing, by the electronic apparatus, data of the plurality of pieces of content,
based on identification that capacity of resources of the electronic apparatus required to process the data of the plurality of pieces of content exceeds the identified state of resources of the electronic apparatus, transmit information about the identified state of resources to the external apparatus for mixing, by the external apparatus, two or more pieces of content among the plurality of pieces of content into one stream based on the identified state of resources, wherein the information about the identified state of resources includes information indicating at least one of a number of decoders in the electronic apparatus, a type of a decoder in the electronic apparatus, a number of scalers in the electronic apparatus, or a type of a scaler in the electronic apparatus,
receive data of the two or more pieces of content mixed into one stream and having an adjusted resolution from the external apparatus and that matches the state of resources of the electronic apparatus that are available for processing, by the electronic apparatus, data of the plurality of pieces of content, and
display images on the display based on the received data of the two or more pieces of content mixed into one stream.

2. The electronic apparatus of claim 1, wherein
the external apparatus comprises a first external apparatus and a second external apparatus, and
the processor is configured to:
transmit the information about the identified state of resources to the first external apparatus, and
receive the data of the two or more pieces of content mixed into one stream from the second external apparatus.

3. The electronic apparatus of claim 2, wherein the processor is configured to:
receive information about a network address or an application from the external apparatus, and
receive the data of the two or more pieces of content mixed into one stream from the second external apparatus through the network address or the application indicated by the received information.

4. The electronic apparatus of claim 1, wherein the two or more pieces of content mixed into one stream are mixed based on priorities given for the plurality of pieces of content.

5. The electronic apparatus of claim 1, wherein the processor is configured to:
display a user interface (UI) corresponding to at least one piece of content among the plurality of pieces of content on the display; and
control the display to display an image of content corresponding to a selected UI based on reception of a user's input to the UI.

6. The electronic apparatus of claim 5, wherein
the plurality of pieces of content corresponds to segments of a multi-angle image, and
the processor is configured to control the display to further display a UI showing direction information of the plurality of pieces of content, based on appended information received from the external apparatus.

7. A server comprising:
an interface; and
a processor configured to:
transmit, to an electronic apparatus, information about a plurality of pieces of content,
obtain information about a state of resources of the electronic apparatus that are available for processing, by the electronic apparatus, data of the plurality of pieces of content through the interface, wherein the obtained information is obtained based on capacity of resources of the electronic apparatus required to process the data of the plurality of pieces of content exceeding the state of resources of the electronic apparatus and includes information indicating at least one of a number of decoders in the electronic apparatus, a type of a decoder in the electronic apparatus, a number of scalers in the electronic apparatus, or a type of a scaler in the electronic apparatus,
adjust resolution of and mix two or more pieces of content among the plurality of pieces of content into one stream based on the obtained information and that matches the state of resources of the electronic apparatus that are available for processing, by the electronic apparatus, data of the plurality of pieces of content, and transmit data of the two or more pieces of content mixed into one stream to the electronic apparatus through the interface.

8. The server of claim 7, wherein the processor is configured to transmit the data of the two or more pieces of content mixed into one stream, from a connectable external apparatus to the electronic apparatus through the interface.

9. The server of claim 8, wherein the processor is configured to transmit information about a network address or an application of an external apparatus capable of providing the two or more pieces of content mixed into one stream to the electronic apparatus through the interface.

10. The server of claim 7, wherein the processor is configured to mix the two or more pieces of content among the plurality of pieces of content based on priorities given for the plurality of pieces of content.

11. A method comprising:
by an electronic apparatus:
receiving information about a plurality of pieces of content from an external apparatus;
identifying a state of resources of the electronic apparatus that are available for processing, by the electronic apparatus, data of the plurality of pieces of content;
based on identification that capacity of resources of the electronic apparatus required to process the data of the plurality of pieces of content exceeds the identified state of resources of the electronic apparatus, transmitting information about the identified state of resources to the external apparatus for mixing, by the external apparatus, two or more pieces of content among the plurality of pieces of content into one stream based on the identified state of resources, wherein the information about the identified state of resources includes information indicating at least one of a number of decoders in the electronic apparatus, a type of a decoder in the electronic apparatus, a number of scalers in the electronic apparatus, or a type of a scaler in the electronic apparatus;
receiving data of the two or more pieces of content mixed into one stream and having an adjusted resolution from the external apparatus and that matches the state of resources of the electronic apparatus that are available for processing, by the electronic apparatus, data of the plurality of pieces of content; and
displaying images based on the received data of the two or more pieces of content mixed into one stream.

12. The method of claim 11, wherein
the external apparatus comprises a first external apparatus and a second external apparatus, and
the transmitting comprises transmitting the information about the identified state of resources to the first external apparatus, and
the receiving data comprises receiving the data of the two or more pieces of content mixed into one stream from the second external apparatus.

13. The method of claim 12, further comprising:
receiving information about a network address or an application from the external apparatus,
wherein the receiving data comprises receiving the data of the two or more pieces of content mixed into one stream from the second external apparatus through the network address or the application indicated by the received information.

\* \* \* \* \*